US011233778B2

(12) United States Patent
Abraham et al.

(10) Patent No.: US 11,233,778 B2
(45) Date of Patent: Jan. 25, 2022

(54) SECURE FORWARDING OF TENANT WORKLOADS IN VIRTUAL NETWORKS

(71) Applicant: Juniper Networks, Inc., Sunnyvale, CA (US)

(72) Inventors: Sanju C. Abraham, Fremont, CA (US); Kiran N. Kasim, Sunnyvale, CA (US); Prasad Miriyala, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 449 days.

(21) Appl. No.: 16/146,713

(22) Filed: Sep. 28, 2018

(65) Prior Publication Data

US 2020/0059459 A1    Feb. 20, 2020

Related U.S. Application Data

(60) Provisional application No. 62/764,700, filed on Aug. 15, 2018, provisional application No. 62/764,699, filed on Aug. 15, 2018.

(51) Int. Cl.
*H04L 29/06* (2006.01)
*H04L 12/46* (2006.01)
(Continued)

(52) U.S. Cl.
CPC ...... *H04L 63/0485* (2013.01); *H04L 12/4633* (2013.01); *H04L 12/4641* (2013.01);
(Continued)

(58) Field of Classification Search
CPC ............. H04L 63/0485; H04L 63/0272; H04L 63/029; H04L 63/164; H04L 12/4633;
(Continued)

(56) References Cited

U.S. PATENT DOCUMENTS 7,184,437 B1    2/2007  Cole et al.
7,627,899 B1   12/2009  Tripathi et al.
(Continued)

FOREIGN PATENT DOCUMENTS

CN      101611610 A    12/2009
CN      102055667 A     5/2011
(Continued)

OTHER PUBLICATIONS

Bouabene, Ghazi, Christophe Jelger, and Christian Tschudin. "Virtual network stacks." In Proceedings of the ACM workshop on Programmable routers for extensible services of tomorrow, pp. 45-50. 2008. (Year: 2008).*

(Continued)

*Primary Examiner* — Luu T Pham
*Assistant Examiner* — Walter J Malinowski
(74) *Attorney, Agent, or Firm* — Shumaker & Sieffert, P.A.

(57) ABSTRACT

In general, techniques are described for enhancing operations of virtual networks. In some examples, a network system includes a plurality of servers interconnected by a switch fabric comprising a plurality of switches interconnected to form a physical network. Each of the servers comprises an operating environment executing one or more virtual machines in communication via one or more virtual networks. The servers comprise a set of virtual routers configured to extend the virtual networks to the operating environments of the virtual machines. A virtual router of the set of virtual routers is configured to prepare tunnel packets by forwarding packets received from virtual machines to an IPSec kernel executing in a host operating network stack, receiving the ESP packets back from the IPSec kernel and forwarding the ESP packets across the virtual networks.

16 Claims, 14 Drawing Sheets

(51) Int. Cl.
*H04L 12/723* (2013.01)
*H04L 12/713* (2013.01)
*H04L 12/715* (2013.01)
*H04L 12/741* (2013.01)
*H04L 12/933* (2013.01)

(52) U.S. Cl.
CPC ............ *H04L 45/50* (2013.01); *H04L 45/586* (2013.01); *H04L 45/64* (2013.01); *H04L 45/745* (2013.01); *H04L 49/15* (2013.01); *H04L 63/029* (2013.01); *H04L 63/0272* (2013.01); *H04L 63/164* (2013.01); *H04L 2212/00* (2013.01)

(58) Field of Classification Search
CPC ... H04L 12/4641; H04L 45/50; H04L 45/586; H04L 45/64; H04L 45/745; H04L 49/15; H04L 2212/00
USPC ......................................................... 713/151
See application file for complete search history.

(56) References Cited

U.S. PATENT DOCUMENTS

| | | | |
|---|---|---|---|
| 9,356,866 B1* | 5/2016 | Sivaramakrishnan | H04L 45/586 |
| 9,571,394 B1 | 2/2017 | Sivaramakrishnan et al. | |
| 10,200,274 B1* | 2/2019 | Suryanarayana | H04L 49/70 |
| 10,523,426 B2* | 12/2019 | Jain | H04L 12/4641 |
| 2003/0051048 A1 | 3/2003 | Watson et al. | |
| 2007/0280243 A1* | 12/2007 | Wray | H04L 12/4633 370/392 |
| 2007/0283339 A1* | 12/2007 | Hardman, Jr. | G06F 21/575 717/168 |
| 2008/0155677 A1* | 6/2008 | Hossain | H04L 63/1433 726/15 |
| 2011/0103259 A1* | 5/2011 | Aybay | H04L 45/306 370/254 |
| 2014/0153577 A1* | 6/2014 | Janakiraman | H04L 61/25 370/392 |
| 2014/0219086 A1* | 8/2014 | Cantu' | H04L 12/4641 370/231 |
| 2014/0286339 A1 | 9/2014 | Vovnoboy et al. | |
| 2015/0244617 A1* | 8/2015 | Nakil | H04L 41/0631 709/224 |
| 2017/0033924 A1* | 2/2017 | Jain | H04L 63/06 |
| 2017/0155724 A1 | 6/2017 | Haddad et al. | |
| 2017/0181210 A1* | 6/2017 | Nadella | H04W 48/16 |
| 2018/0109606 A1* | 4/2018 | Alpert | H04L 12/4641 |
| 2019/0020684 A1* | 1/2019 | Qian | H04L 63/102 |
| 2020/0059458 A1* | 2/2020 | Abraham | H04L 45/586 |
| 2020/0117517 A1 | 4/2020 | Costa et al. | |
| 2020/0120078 A1* | 4/2020 | Mao | H04L 63/0428 |

FOREIGN PATENT DOCUMENTS

| | | | | |
|---|---|---|---|---|
| CN | 102833217 A | 12/2012 | | |
| CN | 108028838 A | 5/2018 | | |
| EP | 1271861 A2 | 1/2003 | | |
| EP | 3611883 A1 * | 2/2020 | ........... | H04L 45/586 |
| WO | WO-2012171427 A1 * | 12/2012 | ............. | H04L 67/42 |
| WO | 2013184846 A1 | 12/2013 | | |
| WO | 2015081766 A1 | 6/2015 | | |
| WO | WO-2015081766 A1 * | 6/2015 | ............. | H04L 67/10 |

OTHER PUBLICATIONS

Foukas, Xenofon, Georgios Patounas, Ahmed Elmokashfi, and Mahesh K. Marina. "Network slicing in 5G: Survey and challenges." IEEE Communications Magazine 55, No. 5 (2017): 94-100. (Year: 2017).*

Kim, J., Jang, K., Lee, K., Ma, S., Shim, J. and Moon, S., Apr. 2015, NBA (network balancing act) a high-performance packet processing framework for heterogeneous processors. In Proceedings of the Tenth European Conference on Computer Systems (pp. 1-14). (Year: 2015).*

Mathur, Suhas, and Wade Trappe. "BIT-TRAPS: Building information-theoretic traffic privacy into packet streams." IEEE Transactions on Information Forensics and Security 6, No. 3 (2011): 752-762. (Year: 2011).*

U.S. Appl. No. 16/145,048, by Juniper Networks, Inc., (Inventor: Sanju C. Abraham), filed Sep. 27, 2018.

Restriction Requirement from U.S. Appl. No. 16/145,048, dated Jul. 24, 2020, 7 pp.

Response to Extended Search Report dated Oct. 4, 2019, from counterpart European Application No. 19180811.2, filed Aug. 19, 2020, 12 pp.

Extended Search Report from counterpart European Application No. 19180811.2, dated Oct. 4, 2019, 8 pp.

Office Action from U.S. Appl. No. 16/145,048, dated Dec. 24, 2020, 12 pp.

Response to the Office Action dated Dec. 24, 2020, from U.S. Appl. No. 16/145,048, filed Mar. 24, 2021, 19 pp.

First Office Action and Search Report, and translation thereof, from counterpart Chinese Application No. 201910578155.6, dated May 17, 2021, 21 pp.

Notice of Allowance from U.S. Appl. No. 16/145,048, dated Jul. 14, 2021, 8 pp.

"IPSEC(4) FreeBSD Kernel Interfaces Manual," FreeBSD 13.0, Retrieved Jun. 29, 2021 from: https://www.freebsd.org/cgi/man.cgi?query=if_ipsec&sektion=4&manpath=FreeBSD+13.0-RELEASE+and+Ports, Feb. 6, 2017, 4 pp.

Notice of Allowance from U.S. Appl. No. 16/145,048, dated Oct. 14, 2021, 14 pp.

* cited by examiner

SECURE FORWARDING OF TENANT WORKLOADS IN VIRTUAL NETWORKS

This application claims the benefit of U.S. Provisional Patent Application No. 62/764,699, filed on Aug. 15, 2018 and U.S. Provisional Patent Application No. 62/764,700, filed on Aug. 15, 2018, the entire contents of which are incorporated herein by reference.

TECHNICAL FIELD

Techniques of this disclosure relate generally to computer networks and more particularly to virtual networks.

BACKGROUND

In a large-scale computer network, such as a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized networks are becoming a core foundation of the modem information technology (IT) infrastructure. For example, modern data centers have extensively utilized virtualized environments in which virtual hosts, also referred to herein as virtual execution elements, such virtual machines or containers, are deployed and executed on an underlying compute platform of physical computing devices.

Virtualization within a computer network can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

SUMMARY

In general, techniques are described for enhancing operations of virtual networks. For example, a virtual network controller is described that configures and manages an overlay network within a physical network formed by plurality of switches. A plurality of servers is interconnected by the switch fabric, and each of the servers provides an operating environment executing one or more virtual machines in communication via the overlay networks. A set of virtual routers operating within the servers and/or other devices of the physical network extends the overlay network as a virtual network to the operating environment of the virtual machines. The controller may instruct the servers and the virtual routers to perform various operations, such as forwarding traffic through the overlay networks; re-routing traffic in the virtual networks due to network events; replicating traffic for multicasting, networking services including security, NAT, mirroring, and load balancing; providing multi-tenant services to support multiple virtual networks; monitoring and logging traffic characteristics within the virtual networks; and other operations.

The techniques described herein may be utilized to enhance, for example, operation of the virtual routers or other devices that provide virtual networks. In general, a virtual router for a virtual network executes multiple routing instances for corresponding virtual networks. Each virtual network interconnects multiple virtual routers collectively implementing the virtual network. Packets received by the virtual router from the underlying physical network fabric may include an outer header to allow the physical network fabric to tunnel the payload or "inner packet" to a physical network address for a network interface of the server that executes the virtual router. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In one example, a method includes receiving a packet at a virtual router, the virtual router executing in kernel space of a first computing device in a virtual network stack connected to a virtual network fabric, the packet including a source address and a destination address, the destination address associated with a virtual machine executing on a second computing device; forwarding the packet from the virtual router to a host operating system (OS) networking stack associated with a host OS operating on the first computing device, wherein the host OS networking stack includes an encryption module that executes in kernel space on the first computing device, wherein the host OS networking stack is connected to a physical network fabric operating as an underlay fabric for the virtual network fabric; receiving the forwarded packet at the encryption module and encrypting the forwarded packet to form an encapsulated packet that preserves the source and destination addresses; returning the encapsulated packet to the virtual router; and transmitting the encapsulated packet from the virtual router to the virtual machine associated with the destination address via the physical network fabric.

In one example, a network system includes a switch fabric comprising a plurality of switches interconnected to form a physical network; a virtual network controller device configured to configure and manage one or more virtual networks within the physical network; and a plurality of servers interconnected by the switch fabric, wherein each of the servers comprises an operating environment executing one or more virtual machines in communication via the one or more virtual networks, wherein the servers include a first server and a second server, wherein each server includes a host operating system (OS) executing in kernel space on the server, wherein a virtual router executes in kernel space on each server in a virtual network stack connected to one or more of the virtual networks, wherein each virtual router is configured to extend the one or more virtual networks to the operating environments of the virtual machines, wherein the first server is configured to: receive, at the virtual router of the first server, a packet sent from one of the one or more virtual machines executing on the first server, the packet including a source address and a destination address; forward the packet from the virtual router of the first server to a host OS networking stack associated with the host OS executing in kernel space of the first server, wherein the host OS networking stack includes an encryption module that executes in kernel space on the first server and wherein the host OS networking stack is connected to the switch fabric operating as an underlay fabric for one or more of the virtual networks; receive the forwarded packet at the encryption module and encrypt the forwarded packet to form an encapsulated packet that preserves the source and destination addresses; return the encapsulated packet to the virtual router; and transmit the encapsulated packet from the virtual router to the destination address via the switch fabric.

In another example, a method includes receiving an encapsulated packet at a virtual router executing within a virtual network stack in kernel space of a computing device, the encapsulated packet including a source address and a destination address associated with a virtual machine executing on the computing device, wherein the virtual network stack includes an interface to a virtual network fabric; forwarding the encapsulated packet from the virtual router to a host operating system (OS) networking stack associated with a host OS operating on the computing device, wherein the host OS networking stack includes an encryption module that executes in kernel space on the computing device, wherein the host OS networking stack includes an interface to a physical network fabric that operates as an underlay fabric for the virtual network fabric; receiving the forwarded encapsulated packet at the encryption module and decrypting the forwarded encapsulated packet to form a decrypted packet that preserves the source and destination addresses; returning the decrypted packet to the virtual router; and transmitting the decrypted packet from the virtual router to the virtual machine associated with the destination address.

In one example, a non-transitory computer-readable medium comprising instructions for causing one or more programmable processors of a computing device to receive, at a virtual router executing within a virtual network stack in kernel space of the computing device, a packet from a virtual machine executing on the computing device, the packet including a source address and a destination address, wherein the virtual network stack includes an interface to a virtual network fabric; forward the packet from the virtual router executing within the virtual network stack to a host operating system (OS) networking stack associated with a host OS operating on the computing device, wherein the host OS networking stack includes an encryption module that executes in kernel space on the computing device, wherein the host OS networking stack includes an interface to a physical network fabric operating as an underlay fabric for the virtual network fabric; receive the forwarded packet at the encryption module and encrypt the forwarded packet to form an encapsulated packet that preserves the source and destination addresses; return the encapsulated packet to the virtual router; and transmit the encapsulated packet from the virtual router to the virtual machine associated with the destination address via the physical network fabric.

In another example, a non-transitory computer-readable medium includes instructions for causing one or more programmable processors of a computing device to receive an encapsulated packet at a virtual router executing within a virtual network stack in kernel space of the computing device, the encapsulated packet including a source address and a destination address associated with a virtual machine executing on the computing device, wherein the virtual network stack includes an interface to a virtual network fabric; forward the encapsulated packet from the virtual router to a host operating system (OS) networking stack associated with a host OS operating on the computing device, wherein the host OS networking stack includes an encryption module that executes in kernel space on the computing device, wherein the host OS networking stack includes an interface to a physical network fabric operating as an underlay fabric for the virtual network fabric; receive the forwarded encapsulated packet at the encryption module and decrypt the forwarded encapsulated packet to form a decrypted packet that preserves the source and destination addresses; return the decrypted packet to the virtual router; and transmit the decrypted packet from the virtual router to the virtual machine associated with the destination address.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
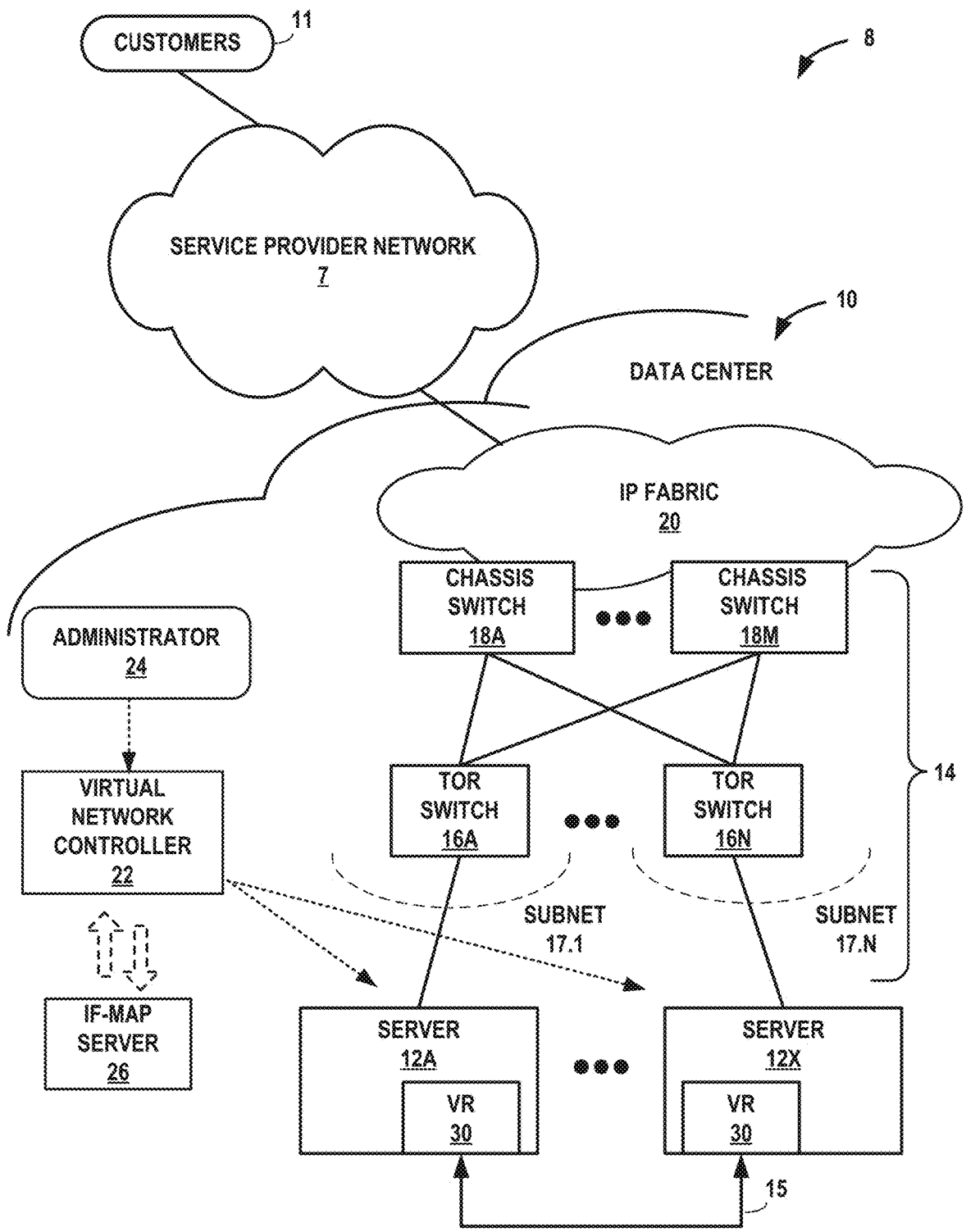
FIG. 1 is a block diagram illustrating an example network having a data center in which examples of the techniques described herein may be implemented.

FIG. 1 is a block diagram illustrating an example network 8 having a data center 10 in which examples of the techniques described herein may be implemented. In general, data center 10 provides an operating environment for applications and services for customers 11 coupled to the data center by service provider network 7. Data center 10 may, for example, host infrastructure equipment, such as networking and storage systems, redundant power supplies, and environmental controls. Service provider network 7 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 may be a facility that provides network services for customers 11. Customers 11 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, data center 10 may be individual network servers, network peers, or otherwise.

In this example, data center 10 includes a set of storage systems and application servers 12A-12X (herein, "servers 12") interconnected via high-speed switch fabric 14 provided by one or more tiers of physical network switches and routers. Switch fabric 14 is provided by a set of interconnected top-of-rack (TOR) switches 16A-16BN (collectively, "TOR switches 16") coupled to a distribution layer of chassis switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to IP fabric 20 and service provider network 7 via subnets 17.1-17.N (collectively "subnets 17"). Chassis switches 18 aggregate traffic flows and provides high-speed connectivity between TOR switches 16. TOR switches 16 may be network devices that provide layer two (e.g., MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data center 10 and customers 11 by service provider network 7.

Virtual network controller 22 ("VNC") provides a logically and in some cases physically centralized controller for facilitating operation of one or more virtual networks within data center 10 in accordance with one or more embodiments of this disclosure. In some examples, virtual network controller 22 may operate in response to configuration input received from network administrator 24. Additional information regarding virtual network controller 22 operating in conjunction with other devices of data center 10 or other software-defined network is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

In one example approach, virtual network controller 22 is a logically centralized but physically distributed software defined network ("SDN") controller. Physically distributed means that the virtual network controller 22 may include multiple types of nodes, each of which may have multiple instances for high availability (HA) and horizontal scaling. In one such example approach, the virtual network controller 22 includes three types of nodes: configuration nodes, control nodes and analytics nodes. These node instances may be implemented in physical servers 12 or on virtual machines. In one such example approach, configuration nodes in virtual network controller 22 configure the control nodes via a technology data model stored on Interface for Metadata Access Points (IF-MAP) server 26.

Typically, the traffic between any two network devices, such as between network devices within IP fabric 20 (not shown) or between servers 12 and customers 11 or between servers 12, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyze one particular multipath routing strategy involving the assignment of flows to bins by hashing packet header fields that sends all packets from a particular network flow over a single deterministic path.

For example, a "flow" can be defined by the five values used in a header of a packet, or "five-tuple," i.e., the protocol, Source IP address, Destination IP address, Source port and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

In accordance with various aspects of the techniques described in this disclosure, one or more of servers 12 may include a virtual router that executes multiple routing instances for corresponding virtual networks within data center 10. Packets received by the virtual router of server 12A, for instance, from the underlying physical network fabric may include an outer header to allow the physical network fabric to tunnel the payload or "inner packet" to a physical network address for a network interface of server 12A that executes the virtual router. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier. In the example approach of FIG. 1, a virtual router 30 on server 12A communicates via a tunnel 15 to a virtual router 30 on server 12X, as will be discussed in more detail below.

In some example approaches, virtual routers 30 buffer and aggregate multiple tunneled packets received from the underlying physical network fabric prior to delivery to the appropriate routing instance for the packets. In some examples, the virtual router 30 aggregates multiple packets according to matching criteria that includes the virtual network identifier of the outer header as well as one or more fields of the inner header. That is, a virtual router 30 executing on one of servers 12 may receive inbound tunnel packets of a packet flow from switches 16 and, prior to routing the tunnel packets to a locally executing virtual machine, process the tunnel packets to construct a single, aggregate tunnel packet for forwarding to the virtual machine. That is, the virtual router 30 may buffer multiple inbound tunnel packets and construct the single, tunnel packet in which the payloads of the multiple tunnel packets are combined into a single payload and the outer/overlay headers on the tunnel packets are removed and replaced with a single header virtual network identifier. In this way, the aggregate tunnel packet can be forwarded by the virtual router 30 to a virtual machine as if a single inbound tunnel packet was received from the virtual network. Moreover, to perform the aggregation operation, the virtual router 30 may leverage a kernel-based offload engine that seamlessly and automatically directs the aggregation of tunnel packets.

As one example, virtual router 30 may extend a Generic Receive Offload (GRO) routine available by the server kernel and that is specialized for processing layer two (L2) packets, but the virtual router may leverage the GRO routine in a way so as to utilize the routine to manipulate multiple tunneled packets as if they were L2 packets, thereby efficiently constructing an aggregate tunnel packet. In some examples, the virtual router provides multiple tunneled packets to GRO for aggregation by, at least in part, setting the respective virtual network identifiers and invoking the GRO routine as if the virtual network identifiers are a L2 header for the inner packets of the tunneled packets. In this way, the GRO routine considers each packet received from the virtual router for aggregation purposes as a non-tunneled, L2 packet that includes at least a portion of an L2 header (e.g., a destination MAC address) set to the virtual network identifier for a received tunneled packet and a layer 3 ("network") packet that corresponds to the inner packet for the received tunnel packet. By matching according to the L2 ("data link") header and one or more header fields of the layer 3 packet, the GRO routine may aggregate multiple such packets into an aggregated packet for delivery to the appropriate routing instance. In this way, the aggregation techniques may increase the virtual router bandwidth by reducing the number of packet headers for processing.

In some example implementations, the virtual routers 30 executing on servers 12 may steer received inbound tunnel packets among multiple processor cores to facilitate packet processing load balancing among the cores when processing the packets for routing to one or more virtual and/or physical machines. As one example, server 12A may include multiple network interface cards and multiple processor cores to execute the virtual router and may steer received packets among multiple processor cores to facilitate packet processing load balancing among the cores. For instance, a particular network interface card of server 12A may be associated with a designated processor core to which the network interface card directs all received packets. The various processor cores, rather than processing each of the received packets, offloads flows to one or more other processor cores, in accordance with a hash function applied to at least one of the inner and outer packet headers, for processing to take advantage of available work cycles of the other processor cores.

In other example implementations, the virtual routers executing on servers 12 may proactively add, by the virtual router, flow table entries to identify reverse flows of flows processed by a routing instance of the virtual router. In an example implementation, the virtual router of server 12A may proactively add flow table entries to identify reverse flows of flows processed by a routing instance of the virtual router. For example, a virtual machine executing on server 12A and a member of a virtual network implemented by data center 10 may receive an initial inbound tunnel packet for a packet flow originated by virtual machine executing on server 12X and also a member of the virtual network. Upon receiving the initial inbound tunnel packet, in addition to adding a flow table entry specifically for the inbound packet flow, the virtual router of server 12A may also proactively add a flow table entry specifically for the reverse packet flow (i.e., an outbound packet flow) that corresponds to the received inbound packet flow. In this way, server 12A may predict the need to process outbound tunnel packets having reverse flow criteria and, as a result, more efficiently look up and use the flow table entry for the reverse packet flow to process subsequent packets that belong to the reverse packet flow. The approaches described above in the context of FIG. 1 are also described in U.S. Pat. No. 9,571,394, issued Feb. 14, 2017, and entitled TUNNELED PACKET AGGREGATION FOR VIRTUAL NETWORKS, the descriptions of which is incorporated herein by reference.

Figure 2:
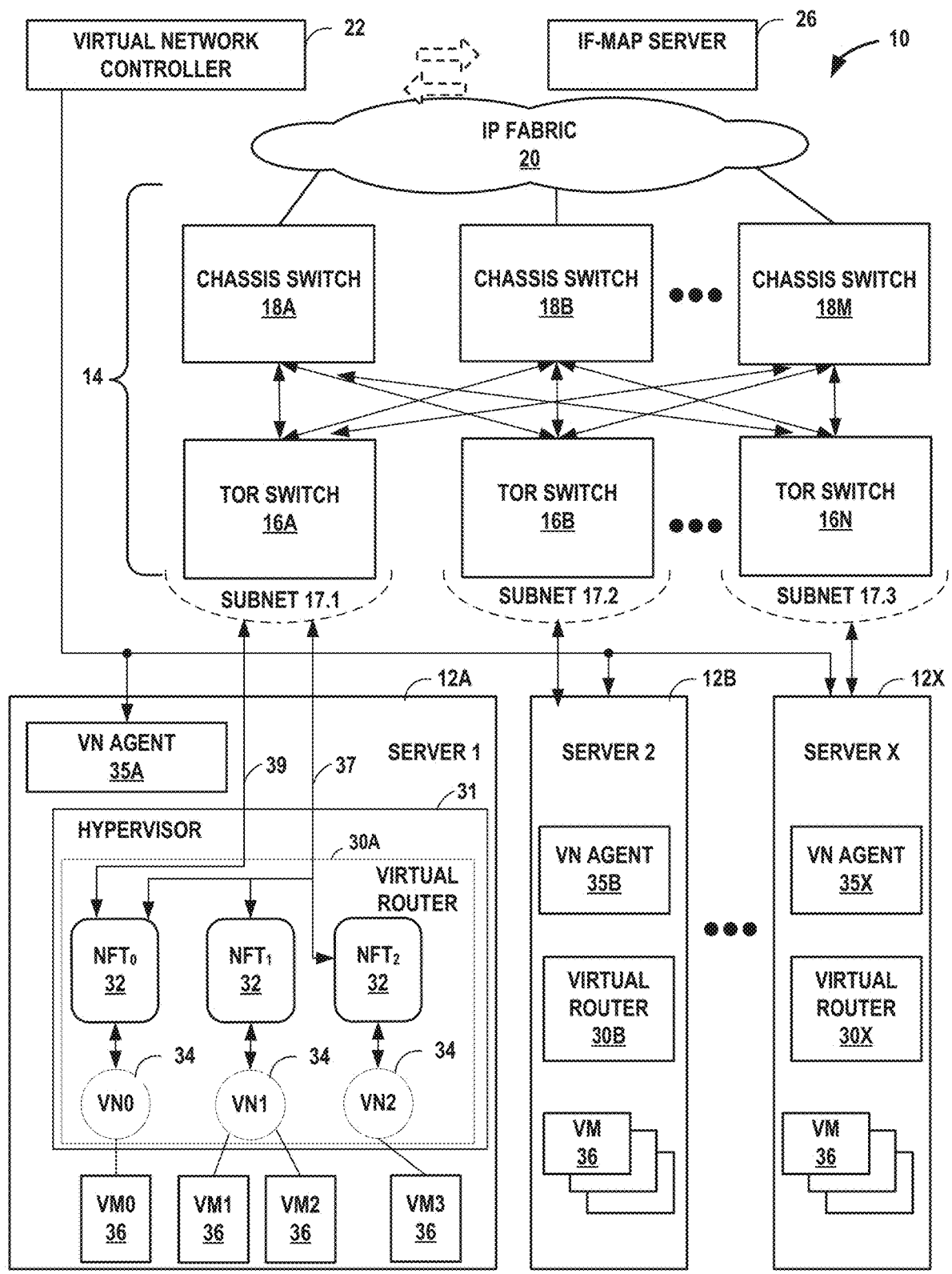
FIG. 2 is a block diagram illustrating an example implementation of the data center of FIG. 1 in further detail.

FIG. 2 is a block diagram illustrating an example implementation of data center 10 of FIG. 1 in further detail. In the example of FIG. 2, data center 10 includes an overlay network that extends switch fabric 14 from physical switches 16, 18 to software or "virtual" switches 30A-30X (collectively, "virtual routers 30"). Virtual routers 30 dynamically create and manage one or more virtual networks 34 usable for communication between application instances. In one example, virtual routers 30 execute the virtual network as an overlay network, which provides the capability to decouple an application's virtual address from a physical address (e.g., IP address) of the one of servers 12A-12X ("servers 12") on which the application is executing. Each virtual network may use its own addressing and security scheme and may be viewed as orthogonal from the physical network and its addressing scheme. Various techniques may be used to transport packets within and across virtual networks 34 over the physical network. In some examples, the techniques described in this disclosure provide multicast service within virtual networks 34 without requiring multicast support in the underlying physical network.

Each virtual router 30 may execute within a hypervisor 31, a host operating system or other component of each of servers 12. Each of servers 12 may represent an x86 or other general-purpose or special-purpose server capable of executing virtual machines 36. In the example of FIG. 2, virtual router 30A executes within hypervisor 31, also often referred to as a virtual machine manager (VMM), which provides a virtualization platform that allows multiple operating systems to run concurrently on one of servers 12. In the example of FIG. 2, virtual router 30A manages virtual networks 34, each of which provides a network environment for use by the one or more virtual machines (VMs) 36 executing on top of the virtualization platform provided by hypervisor 31. Each VM 36 is associated with one of the virtual networks VN0-VN1 and may represent tenant VMs running customer applications such as Web servers, database servers, enterprise applications, or hosting virtualized services used to create service chains. In some cases, any one or more of servers 12 or another computing device may host customer applications directly, i.e., not as virtual machines. Virtual machines as referenced herein, e.g., VMs 36, 110, and servers 12 or a separate computing device that hosts a customer application may alternatively referred to as "hosts."

In general, each VM 36 may be any type of software application and may be assigned a virtual address for use within a corresponding virtual network 34, where each of the virtual networks may be a different virtual subnet provided by virtual router 30A. A VM 36 may be assigned its own virtual layer three (L3) IP address, for example, for sending and receiving communications but may be unaware of an IP address of the physical server 12A on which the virtual machine is executing. In this way, a "virtual address" is an address for an application that differs from the logical address for the underlying, physical computer system, e.g., server 12A in the example of FIG. 2.

In one implementation, each of servers 12 includes a corresponding one of virtual network (VN) agents 35A-35X (collectively, "VN agents 35") that controls the overlay of virtual networks 34 and that coordinates the routing of data packets within server 12. In general, each VN agent 35 communicates with virtual network controller 22, which generates commands to control routing of packets through data center 10. VN agents 35 may operate as a proxy for control plane messages between virtual machines 36 and virtual network controller 22. For example, a VM 36 may request to send a message using its virtual address via the VN agent 35A, and VN agent 35A may in turn send the message and request that a response to the message be received for the virtual address of the VM 36 that originated the first message. In some cases, a VM 36 may invoke a procedure or function call presented by an application programming interface of VN agent 35A, and the VN agent 35A may handle encapsulation of the message as well, including addressing.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within virtual routers 30, e.g., within the hypervisor 31 or the host operating system running on each of servers 12. As another example, encapsulation and de-capsulation functions may be performed at the edge of switch fabric 14 at a first-hop TOR switch 16 that is one hop removed from the application instance that originated the packet. As noted above, this functionality is referred to herein as tunneling and may be used within data center 10 to create one or more overlay networks. Besides IPinIP, other example tunneling protocols that may be used include IP over GRE, VxLAN, MPLS over GRE, MPLS over UDP, etc.

As noted above, virtual network controller 22 provides a logically centralized controller for facilitating operation of one or more virtual networks within data center 10. Virtual network controller 22 may, for example, maintain a routing information base, e.g., one or more routing tables that store routing information for the physical network as well as one or more overlay networks of data center 10. Similarly, switches 16, 18 and virtual routers 30 maintain routing information, such as one or more routing and/or forwarding tables. In one example implementation, virtual router 30A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with a tunnel header that may include one or more headers for different layers of the virtual network protocol stack.

In one such example approach, virtual machine VM 1 sends an "inner packet" to virtual router 30A by an internal link. Virtual router 30A uses NFTi to look up a virtual network destination network address for the inner packet. In one such example approach, NFTi specifies an outbound interface for virtual router 30A and encapsulation for the inner packet. Virtual router 30A applies the encapsulation to add a tunnel header to generate an outer packet and outputs the outer packet on the outbound interface or, in this case, toward TOR switch 16A.

The routing information may, for example, map packet key information (e.g., destination IP information and other select information from packet headers) to one or more specific next hops within the networks provided by virtual routers 30 and switch fabric 14. In some case, the next hops may be chained next hops that specify a set of operations to be performed on each packet when forwarding the packet, such as may be used for flooding next hops and multicast replication. In some cases, virtual network controller 22 maintains the routing information in the form of a radix tree having leaf nodes that represent destinations within the network. U.S. Pat. No. 7,184,437 provides details on an exemplary embodiment of a router that utilizes a radix tree for route resolution, the contents of U.S. Pat. No. 7,184,437 being incorporated herein by reference in its entirety.

As shown in FIG. 2, each virtual network 34 provides an encapsulated packet communications framework 37 for the overlay network established through switch fabric 14. In this way, network packets associated with any of virtual machines 36 may be transported using encapsulated packet communications framework 37 via the overlay network. In addition, in the example of FIG. 2, each virtual router 30 includes a default network forwarding table $NFT_0$ and provides a default route that allows a packet to be forwarded to virtual subnet VN0 without encapsulation, i.e., non-encapsulated packet communications 39 per the routing rules of the physical network of data center 10. In this way, subnet VN0 and virtual default network forwarding table NFT$_0$ provide a mechanism for bypassing the overlay network and sending non-encapsulated packet communications via non-encapsulated communications framework 39 to switch fabric 14.

Moreover, virtual network controller 22 and virtual routers 30 may communicate using virtual subnet VN0 in accordance with default network forwarding table NFT$_0$ 32 during discovery and initialization of the overlay network, and during conditions where a failed link has temporarily halted communication via the overlay network. Once connectivity with the virtual network controller 22 is established, the virtual network controller 22 updates its local routing table to take into account new information about any failed links and directs virtual routers 30 to update their local network forwarding tables 32. For example, virtual network controller 22 may output commands to virtual network agents 35 to update one or more NFTs 32 to direct virtual routers 30 to change the tunneling encapsulation so as to re-route communications within the overlay network such as, for example, to avoid a failed link.

When a link failure is detected, a virtual network agent 35 local to the failed link (e.g., VN Agent 35A) may immediately change the encapsulation of network packets to redirect traffic within the overlay network and may notify virtual network controller 22 of the routing change. In turn, virtual network controller 22 may update its routing information and may issue messages to other virtual network agents 35 to update local routing information stored by the virtual network agents within network forwarding tables 32.

Figure 3A:
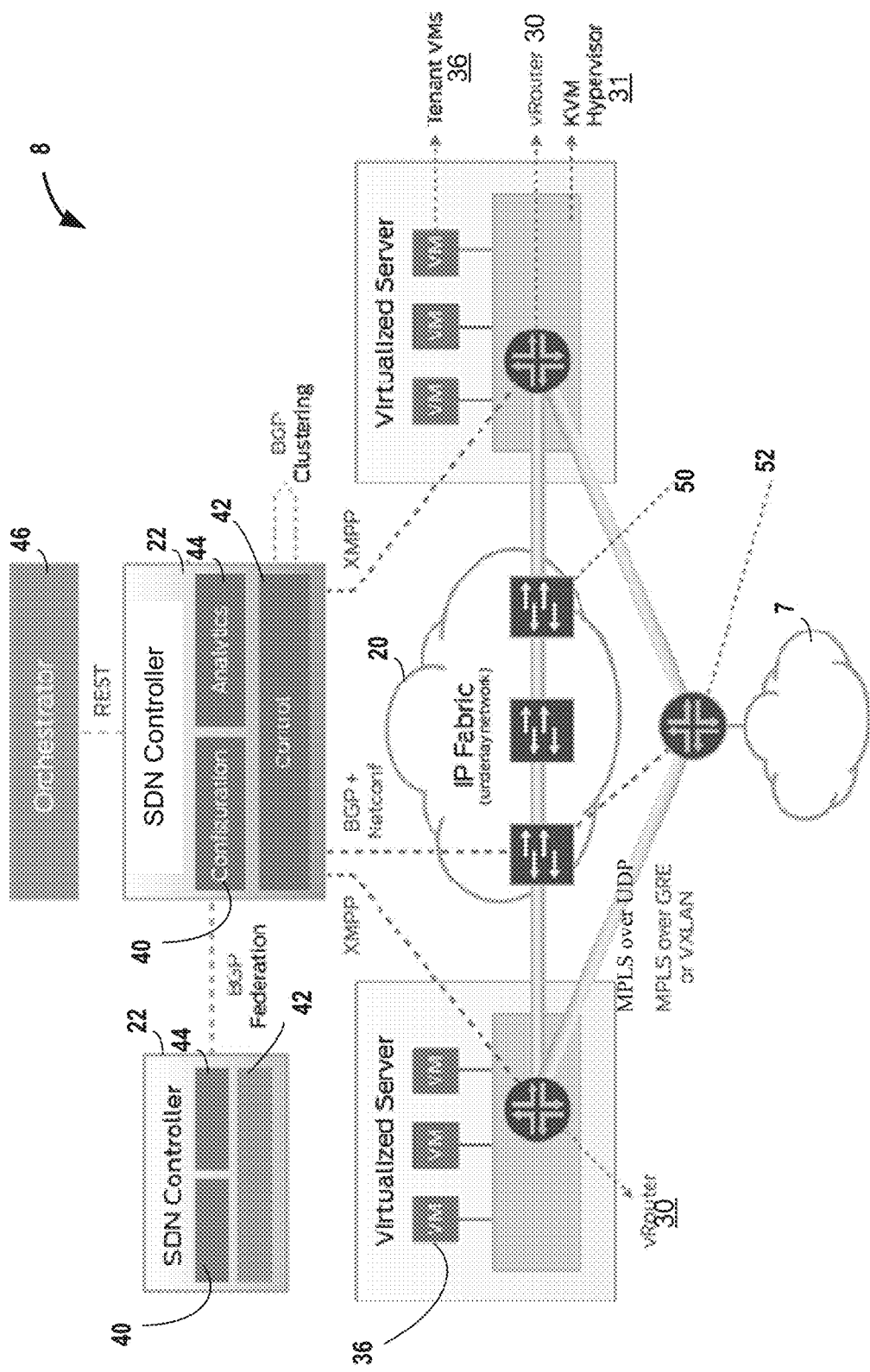
FIG. 3A is a block diagram illustrating a software defined network according to techniques described herein.

FIG. 3A is a block diagram illustrating an example software defined network implementation of network 8 (FIGS. 1-2) according to techniques described herein. In one example approach, each virtual router 30 forwards packets from one virtual machine 36 to other virtual machines via a set of server-to-server tunnels. The tunnels form an overlay network sitting on top of the physical network (such as, for example, a physical IP-over-Ethernet network). In the example shown in FIG. 3A, virtual machines 36 on one virtual router 30 communicate with virtual machines 36 on other virtual routers 30 via MPLS over GRE, MPLS over UDP or VXLAN.

In the example approach of FIG. 3A, virtual network controller 22 is a software defined network (SDN) controller. As noted above in the discussion of FIG. 1, in one example approach, virtual network controller 22 is logically centralized but may be physically distributed across many devices. In one example approach, controller 22 includes multiple types of nodes, each of which may have multiple instances for high availability (HA) and horizontal scaling. In one such example approach, the virtual network controller 22 includes three types of nodes: configuration nodes 40, control nodes 42 and analytics nodes 44. These node instances may be implemented in physical servers 12 or on virtual machines. In one such example approach, configuration nodes 40 in virtual network controller 22 configure the control nodes via a technology data model stored on Interface for Metadata Access Points (IF-MAP) server 26.

In one example approach, configuration nodes 40 provide a management layer used to configure control node 42. In the example shown in FIG. 3A, configuration nodes 40 provide a northbound Representational State Transfer (REST) application programming interface (API) that may be used by an orchestrator 46 to configure network 8 or to extract operational status of network 8. In one example approach, instantiated services are represented by objects in a horizontally scalable database that is described by a formal service data model. The configuration nodes also contain a transformation engine (sometimes referred to as a compiler) that transforms the objects in the high-level service data model into corresponding lower-level objects in the technology data model. The high-level service data model describes what services need to be implemented while the low-level technology data model describes how those services need to be implemented. In one example approach, objects describing instantiated services are defined via a formal service data model. That formal service data model may be converted into a low-level technology data model describing how the services are to be implemented. In one such example approach, configuration nodes 40 in virtual network controller 22 publish the contents of the low-level technology data model stored on Interface for Metadata Access Points (IF-MAP) server 26 to the control nodes using the IF-MAP protocol.

In one example approach, control nodes 42 implement the logically centralized portion of the control plane. Not all control plane functions are logically centralized-some control plane functions are still implemented in a distributed fashion on the physical and virtual routers and switches in the network 8. The control nodes 42 may use the IF-MAP protocol to monitor the contents of the low-level technology data model as computed by the configuration nodes 40 that describe the desired state of the network. The control nodes 42 may use a combination of southbound protocols (such as Extensible Messaging and Presence Protocol (XMPP)) to configure virtual routers 30 and Border Gateway Protocol (BGP) and Network Configuration (NETCONF) protocols to control physical routers (such as underlay switches 50 in IP fabric 20). In some such example approaches the BGP and NETCONF protocols may also be used to control gateways 52. In one example approach, control nodes 42 also use BGP for state synchronization among each other when there are multiple instances of control node 42 for scale-out and HA reasons.

In one example approach, analytics nodes 44 are used to collect, collate, and present analytics information for troubleshooting problems and for determining network usage. In one such example approach, each component of network 8 generates detailed event records for significant events in the system. These event records may be sent to one of multiple instances (for scale-out) of the analytics node 44 that collate and store the information in a horizontally scalable database using a format that is optimized for time-series analysis and queries. The analytics nodes 44 may also include mechanisms to automatically trigger the collection of more detailed records when certain events occur, allowing network control 22 to get to the root cause of any issue without having to reproduce it. In one example approach, analytics nodes 44 also provide a northbound analytics query REST API to orchestrator 46.

In one example approach, virtual network controller 22 implements three basic building blocks: multi-tenancy, gateway functions and service chaining. Multi-tenancy, also known as network virtualization or network slicing, is the ability to create virtual networks that provide closed user groups to sets of VMs 36. Gateway functions refer to the ability to connect virtual networks to physical networks via a gateway router (for example, the Internet) and the ability to attach a non-virtualized server or networking service to a virtual network via a gateway. Service chaining, also known as NFV, is the ability to steer flows of traffic through a sequence of physical or virtual network services such as firewalls, DPI, or load balancers.

Figure 3B:
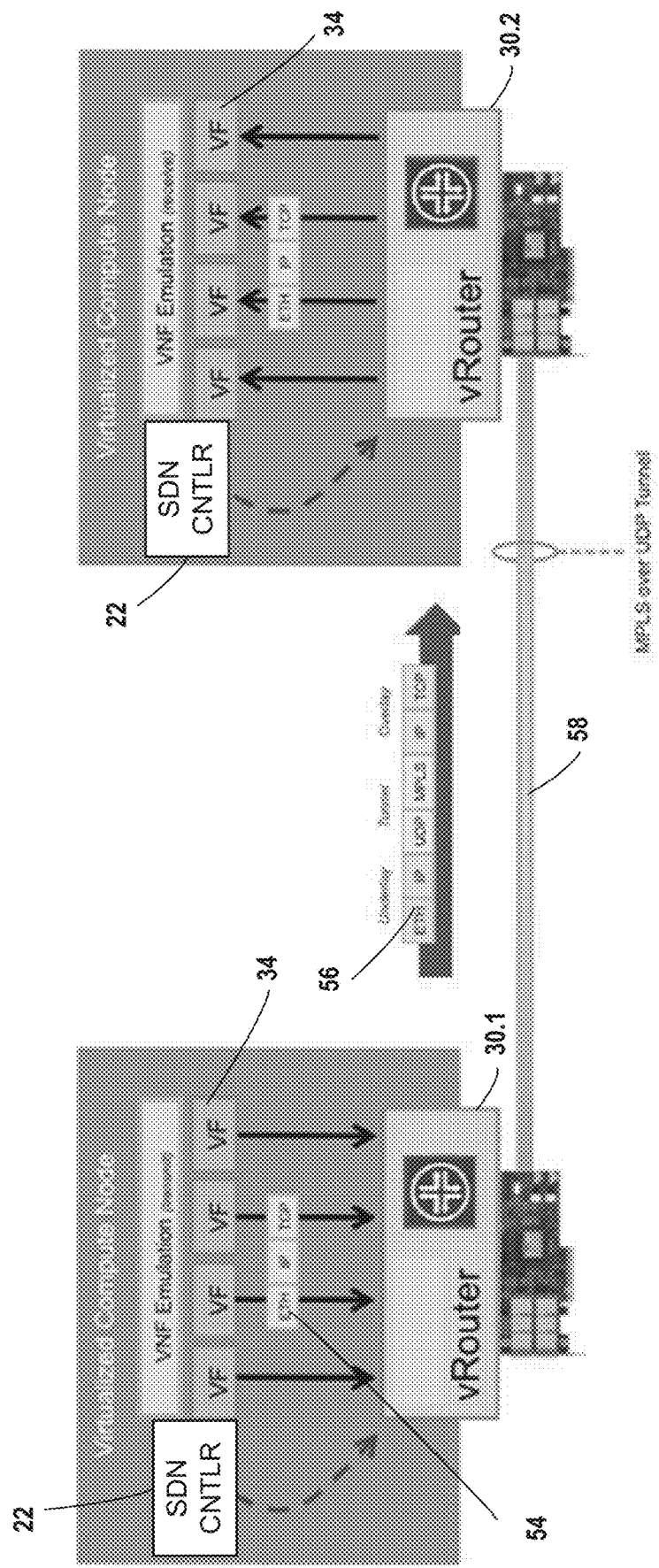
FIG. 3B is a block diagram illustrating tunnel communications in the software defined network of FIG. 3A.

FIG. 3B is a block diagram illustrating tunnel communications in the software defined network of FIG. 3A. In the example approach of FIG. 3B, virtual network controller 22 configures virtual routers 30.1 and 30.2 such that virtual machines 36 connected to virtual router 30.1 communicate with virtual machines 36 connected to virtual router 30.2 via an MPLS over UDP tunnel 58. As can be seen in FIG. 3B, IP packets 54 transferred across virtual fabric 34 are encapsulated using the MPLS over UDP protocol before being as encapsulated IP packets 56 via a tunnel 58 across a physical network.

To date, end-to-end encryption via a tunnel mechanism such as MPLS over GRE, MPLS over UDP or VXLAN is not truly end-to-end. Typically, encapsulation is performed as a service on a service chain, or by a dedicated encryption device or firewall. Packets may move unencrypted between physical cards within a server 12 until they arrive at the node that performs the encryption. At times, it is desirable to provide virtual router to virtual router end-to-end encryption as a means to secure multi-tenant traffic that egresses a virtual router 30.

In data center and cloud networks, application or tenant workloads use Secure Socket Layer (SSL) based encryption mechanisms to secure the application data traversing the network. In addition to this, tenants who need to run applications and be compliant with the PCI DSS (Payment Card Industry Data Security Standard), require highly secure cryptographic algorithms to encrypt the headers and payload of the IP packets. Such applications need network multi-tenancy with locked down routing tables with only specific routes to endpoints governed by stringent policy frameworks.

IP/MPLS and EVPN VXLAN provides a way for multi-tenancy of tenant networks running tenant applications. However, in order to fully secure an application's IP packets, there is a need for encrypting such IP packets at the source using cryptographic algorithms. Furthermore, it has become increasingly important to secure the control plane in orchestration systems and platforms such as Openstack, Docker, Kubernetes, Mesos and others using mechanisms such as SSL or TLS based on PKI (Public Key Infrastructure) certificates. Finally, there is a need for providing secure encryption and key management as an infrastructure service that can be dialed into by any orchestration system/platform through an API (Application Programming Interface).

Figure 3C:
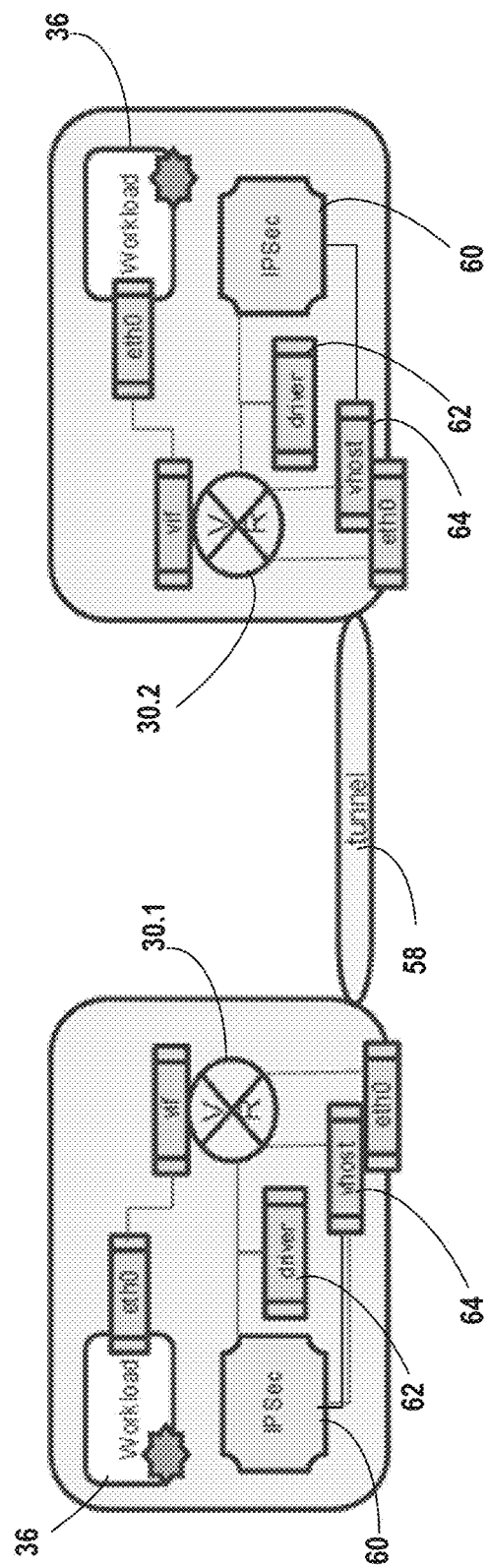
FIG. 3C is a block diagram illustrating an example approach to configuring the tunnel communications of FIG. 3B.

FIG. 3C is a block diagram illustrating an example approach to configuring the tunnel communications of FIG. 3B to provide true virtual router to virtual router end-to-end encryption. In the example approach of FIG. 3C, a virtual machine 36 transmits an IP packet through virtual router 30.1 across IP fabric 20 to a virtual machine 36 attached to virtual router 30.2. In one example approach, a policy on virtual router 30.1 indicates that IP packet traffic being transferred through virtual router 30.1 across IP fabric 20 to a virtual machine 36 attached to virtual router 30.2 is to be transmitted via a tunnel 66 that starts within virtual router 30.1. In various examples described herein, virtual router 30.1 may transfer the packet received from the local virtual machine 36 via an IPVLAN driver 62 in the virtual router network stack of virtual router 30.1 to an encryption module 60 in the host operating system (OS) networking stack of the host computing device, where the packet is encrypted before it is transferred back through vhost 64 to virtual router 30.1. Virtual router 30.1 then transmits the encapsulated packet to virtual router 30.2. In one example approach, encryption module 60 is an Internet Protocol Security (IPSEC) module.

When virtual router 30.2 receives the encapsulated IP packet (via eth0), it transfers the packet via driver 62 in the virtual router network stack of virtual router 30.2 to an encryption module 60 in the host OS networking stack of the host computing device for virtual router 30.2, where the packet is decrypted before it is transferred back through vhost 64 to virtual router 30.1. As further described below, in some examples, a computer node/server 12 may be configured to uniquely utilize an IPVLAN driver (e.g., driver 62) to transfer packets between different network stacks operating within the same kernel module of the device. That is, although an IPVLAN is not necessary utilized within the network, an IPVLAN driver 62 may be installed and configured to operate as a packet transport having endpoints configured on different network stacks within the same kernel space of the computing device. Upon receiving the packet through driver 62, virtual router 30.2 may then transmit the resulting IP packet to the destination virtual machine 36.

The approach illustrated in FIG. 3C enables secure datapath forwarding of L3VPN packets. In one example approach, IPSEC is used because it provides authentication, integrity and encryption for IP packets in tunnel mode. In one example approach, network controller 22 enables full mesh and node to node IPSec and virtual router L3VPN packets are encapsulated within an ESP (Encapsulated Security Payload) of IPSec. This implementation ensures that packet header sizes do not increase by having only IP, UDP headers and IPSec ESP. The L3VPN packet is securely encrypted as part of an Encapsulated Security Payload.

Figure 3D:
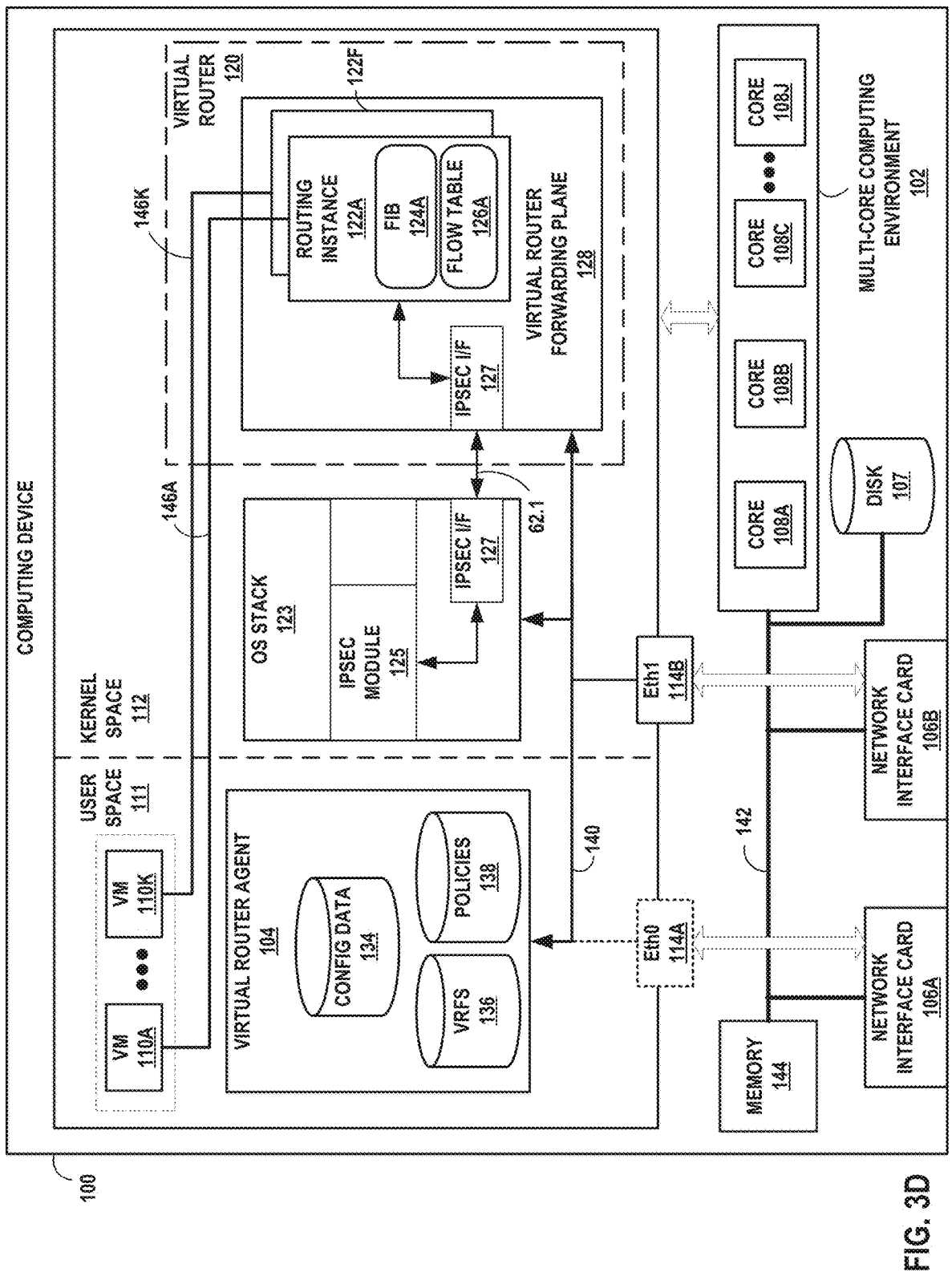
FIG. 3D is a block diagram illustrating a computing device that executes an example virtual router for virtual networks according to techniques described herein.

FIG. 3D is a block diagram illustrating a computing device that executes an example virtual router for virtual networks according to techniques described herein. Computing device 100 may represent any of servers 12 of FIGS. 1-2 or other devices, such as any of TOR switches 16. In the example approach of FIG. 3D, computing device 100 includes a system bus 142 coupling hardware components of a computing device 100 hardware environment. System bus 142 couples memory 144, network interface cards (NICs) 106A-106B (collectively, "NICs 106"), storage disk 107, and multi-core computing environment 102 having a plurality of processing cores 108A-108J (collectively, "processing cores 108"). Network interface cards 106 include interfaces configured to exchange packets using links of an underlying physical network. Multi-core computing environment 102 may include any number of processors and any number of hardware cores from, for example, four to thousands. Each of processing cores 108 each includes an independent execution unit to perform instructions that conform to an instruction set architecture for the core. Processing cores 108 may each be implemented as separate integrated circuits (ICs) or may be combined within one or more multi-core processors (or "many-core" processors) that are each implemented using a single IC (i.e., a chip multiprocessor).

Disk 107 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by cores 108.

Memory 144 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Memory 144 provides a physical address space composed of addressable memory locations.

Memory 144 may in some examples present a non-uniform memory access (NUMA) architecture to multi-core computing environment 102. That is, cores 108 may not have equal memory access time to the various storage media that constitute memory 144. Cores 108 may be configured in some instances to use the portions of memory 144 that offer the lowest memory latency for the cores to reduce overall memory latency.

In some instances, a physical address space for a computer-readable storage medium may be shared among one or more cores 108 (i.e., a shared memory). For example, cores 108A, 108B may be connected via a memory bus (not shown) to one or more DRAM packages, modules, and/or chips (also not shown) that present a physical address space accessible by cores 108A, 108B. While this physical address space may offer the lowest memory access time to cores 108A, 108B of any of portions of memory 144, at least some of the remaining portions of memory 144 may be directly accessible to cores 108A, 108B. One or more of cores 108 may also include an L1/L2/L3 cache or a combination thereof. The respective caches for cores 108 offer the lowest-latency memory access of any of storage media for the cores 108.

Memory 144, network interface cards (NICs) 106A-106B (collectively, "NICs 106"), storage disk 107, and multi-core computing environment 102 provide an operating environment for a software stack that executes a virtual router 120 and one or more virtual machines 110A-110K (collectively, "virtual machines 110") connected through tap interfaces 146A-146K (collectively, "tap interfaces 146") to routing instances 122A-122F (collectively, "routing instances 122"). Virtual machines 110 may represent example instances of any of virtual machines 36 of FIG. 2. The computing device 100 partitions the virtual and/or physical address space provided by main memory 144 and in the case of virtual memory by disk 107 into user space 111, allocated for running user processes, and kernel space 112, which is protected and generally inaccessible by user processes.

Memory 144, network interface cards (NICs) 106A-106B (collectively, "NICs 106"), storage disk 107, and multi-core computing environment 102 may also provide an operating environment for an operating system kernel executing in kernel space 112. The operating system kernel may include, for example, a Linux, Berkeley Software Distribution (BSD), another Unix-variant kernel, or a Windows server operating system kernel, available from Microsoft Corp. The operating system kernel implements an operating system networking stack 123 in kernel space 112 as shown in FIG. 3D.

As further explained below, in some example implementations, kernel space 112 may be configured with multiple network stacks, which may be beneficial when implementing virtual networking on top of an underlying physical network. For example, as further described, operating system network stack 123 may represent a first software network stack executing in kernel space 112 while virtual router 120 may implement its own corresponding software network stack, where each network stack implements corresponding functionality for network layers (e.g., layers 1-3 of the OSI model). In some examples, computing device 100 may be configured to uniquely utilize an IPVLAN driver (e.g., driver 62.1 of FIG. 3D) to transfer packets between different network stacks operating within the same kernel module (e.g., kernel space 112) of the device. That is, an IPVLAN driver 62.1 may be installed and configured to operate as a packet transport having endpoints configured on different network stacks within the same kernel space of the computing device 100.

Computing device 100 may in some instances execute a hypervisor to manage virtual machines 110 (not shown in FIG. 3). An example hypervisor 31 is illustrated in FIG. 2. Example hypervisors include Kernel-based Virtual Machine (KVM) for the Linux kernel, Xen, ESXi available from VMware, Windows Hyper-V available from Microsoft, and other open-source and proprietary hypervisors. In some examples, specialized hardware programmed with routing information such as FIBs 124 may execute the virtual router 120.

Eth0 114A and Eth1 114B represent devices according to a software device model and provide device driver software routines for handling packets for receipt/transmission by corresponding NICs 106. Packets received by NICs 106 from the underlying physical network fabric for the virtual networks may include an outer header to allow the physical network fabric to tunnel the payload or "inner packet" to a physical network address for one of NICs 106. The outer header may include not only the physical network address but also a virtual network identifier such as a VxLAN tag or Multiprotocol Label Switching (MPLS) label that identifies one of the virtual networks as well as the corresponding routing instance 122. An inner packet includes an inner header having a destination network address that conform to the virtual network addressing space for the virtual network identified by the virtual network identifier. For example, virtual router forwarding plane 128 may receive by Eth1 from NIC 106 a packet having an outer header than includes a VxLAN associated in virtual router forwarding plane 128 with routing instance 122A. The packet may have an inner header having a destination network address that is a destination address of VM 110A that taps, via tap interface 146A, into routing instance 122A.

Virtual router 120 in this example includes a kernel space 112 module: virtual router forwarding plane 128, as well as a user space 111 module: virtual router agent 104. Virtual router forwarding plane 128 executes the "forwarding plane" or packet forwarding functionality of the virtual router 120 and virtual router agent 104 executes the "control plane" functionality of the virtual router 120. Virtual router agent 104 may represent an example instance of any of VN agents 35 of FIG. 2.

Virtual router forwarding plane 128 includes multiple routing instances 122A-122F (collectively, "routing instances 122") for corresponding virtual networks. In the example shown in FIG. 3D, each routing instance 122 includes a forwarding information base (FIBs) 124 and a flow table 126. Although illustrated as separate data structures within each routing instance 122, flow tables 126 may in some instances be logical tables implemented as a single table or other associative data structure in which entries for respective flow tables 126 are identifiable by the virtual network identifier (e.g., a VRF identifier such as VxLAN tag or MPLS label)). FIBs 124 may include lookup tables that map destination addresses to destination next hops. The destination addresses may include layer 3 network prefixes or layer 2 MAC addresses. Flow tables 126 may enable application of forwarding policies to flows. Each of flow tables 126 includes flow table entries that each match one or more flows that may traverse virtual router forwarding plane 128 and include a forwarding policy for application to matching flows. For instance, in one example approach, virtual router forwarding plane 128 attempts to match packets processed by routing instance 122A to one of the flow table entries of flow table 126A. If, in this example, a matching flow table entry exists for a given packet in flow table 126A, virtual router forwarding plane 128 applies the flow actions specified in a policy to the packet. This may be referred to as "fast-path" packet processing. If a matching flow table entry does not exist for the packet in flow table 126A, the packet may represent an initial packet for a new packet flow and virtual router forwarding plane 128 may request virtual router agent 104 to install a flow table entry in flow table 126A for the new packet flow via link 140. This may be referred to as "slow-path" packet processing for initial packets of packet flows.

In one example approach, virtual router agent 104 is a user space 111 process executed by computing device 100. Virtual router agent 104 includes configuration data 134, virtual routing and forwarding instances configurations 136 ("VRFs 136"), and policy table 138 ("policies 138"). Virtual router agent 104 exchanges control information with one or more virtual network controllers (e.g., VNC 22 of FIGS. 1-2). Control information may include, virtual network routes, low-level configuration state such as routing instances and forwarding policy for installation to configuration data 134, VRFs 136, and policies 138. Virtual router agent 104 may also report analytics state, install forwarding state to FIBs 124 of virtual router forwarding plane 128, discover VMs 110 and attributes thereof. As noted above, virtual router agent 104 further applies slow-path packet processing for the first (initial) packet of each new flow traversing virtual router forwarding plane 128 and installs corresponding flow entries to flow tables 126 for the new flows for fast path processing by virtual router forwarding plane 128 for subsequent packets of the flows.

In one example approach, as noted above, virtual router 120 is a kernel module that is loaded in the kernel while the host operating system loads an IP framework for transforming packets for IPSec module 125 at startup. In one such example approach, IPSec module 125 implements IPSec with IKEv2, certification management for IKEv2, AES-GCM 256 crypto and AES-NI. In one Linus-based approach, the operating system loads XFRM (the Linux IP framework for transforming packets) at startup. In one example approach, IPSec is configured in full mesh, tunnel mode, across the network 8 connecting the virtual routers 120 with each other.

In one example approach, overlay IP-packets on the transmit (TX) path are sent from the virtual router 120 to IPSec module 125 for encryption. IP-packets with ESP (Encapsulating Security Payload) are then returned to virtual router 120 for forwarding by the virtual router.

In one example approach, virtual router 120 creates the IP/MPLS or VXLAN packet for tenant application with proper L2 and L3 headers for source and destination and writes the packets to IPSec module 125 via an IPSec interface 127. An IPSec kernel executing in IPSec module 125 traps the packets based on the states and policy that would be provisioned as part of the IPSec module bringing up of the connection. Based on the policy matching the IP address in the packet, XFRM transforms and encrypts the entire IP packet using ESP (Encapsulated Security Payload), ensuring the authentication, integrity and confidentiality of the tenant traffic. Once the IPSec Kernel encrypts the packet, IPSec module 125 transfers the packet with IPSec Encapsulated Security Payload (ESP) to virtual router 120. Virtual router 120 receives the encapsulated packet and transmits the packet to the physical network.

At the receiving end, the encrypted packet reaches the destination virtual router 120. In one example approach, ESP packets on the receive (RX) side of virtual router 120 are sent up the OS networking stack 123 where the Linux kernel with IPSec configured decrypts the packet and writes the resulting MPLS/VxLAN packet to virtual router 120. In one example approach, virtual router 120 is configured to look for MPLS, VXLAN and GRE headers only. All other packets, including ESP packets, get transferred via the IPSec kernel interface 127 to IPSec module 125. In one example approach, IPSec module 125 reads the packets from the interface, decrypts the encrypted packets and transfers the decrypted IP packets to virtual router 120. In one example approach, IPSec kernel interface 127 includes a decrypt interface that is plumbed on both the OS networking stack and the virtual router stack 120 such that the decrypted packet, which is essentially the IP/MPLS or VXLAN packet, is read by virtual router 120 and sent to the appropriate tenant application interface based on a Label lookup. As noted above, packet processing happens in the kernel for IPSec module 125 and virtual router 120.

In one example approach, virtual network controller 122 includes an application interface (API) provided such that encryption can be enabled on a virtual router 120 or a virtual router instance 122 basis. For example, all packets from tenant workloads traversing virtual router instances 122 configured to be encryption enabled, encrypt the packet. In one such example approach, virtual network controller 122 provides a graphical user interface (GUI) that allows an administrator to enable or disable encryption for secure forwarding of the tenant workloads on a virtual router instance basis.

In some example implementations, virtual router 104 includes a kernel-based offload engine that seamlessly and automatically aggregates multiple incoming packets from a single packet flow. In one such example, computing device 100 includes a Generic Receive Offload (GRO) configured to aggregate multiple packets received by NICs 106 from the underlying physical network and to merge the multiple packets to a single packet prior to delivery to virtual router forwarding plane 128. In one such example, GRO executes in kernel space 112 as a Linux kernel routine. GRO may, however, be executed in user space 111 in some examples or within one or more of NICs 106. In addition, GRO may be executed during any step of the packet processing process, including prior to or after delivery to virtual router forwarding plane 128. That is, virtual router forwarding plane 128 may in some examples apply GRO to received packets.

In one example approach, GRO aggregates multiple packets according to matching criteria selected from fields of the inner header and virtual network identifier of the packets. In accordance with techniques described herein, GRO may aggregate multiple received packets according to a combination of virtual network identifier and one or more fields of the inner header, e.g., source and destination network address. To aggregate the multiple received packet having matching criteria, GRO may combine (e.g., concatenate) the respective payloads of the received packets while disregarding (i.e., removing) the virtual network identifiers and inner headers of the packets (i.e., concatenating only the payloads of the inner packets and not, in some instances, the entire inner packets themselves) and add a single instance of at least the virtual network identifier and the inner header to the consolidated payloads to form a complete packet. In some instances, GRO adds only a single instance of the inner header common to the aggregated packets so as to form the complete packet as if the complete packet were received directly by one of network interface cards 106.

In some examples, the interface for GRO is configured to receive layer 2 (L2) packets and aggregate L2 packets that have matching destination L2 addresses (e.g., MAC addresses) and, at least in some cases, also matching one or more L3 packet fields and transport layer (layer 4 or "L4") packet fields. To leverage GRO to aggregate multiple received tunnel packets, Eth1 114B or another other component of computing device 100 may append the virtual network identifiers to the received tunnel packets, modify the received tunnel packets using the virtual network identifiers, or otherwise provide the received tunnel packets to GRO as if the virtual network identifiers were instead at least a part of an L2 header for the received packets. Consequently, GRO may view the multiple, tunnel packets as L2 packets, and GRO can be leveraged to aggregate received packets having a common virtual network identifier and other common L3/L4 fields of the inner packet and return an aggregated packet having the common virtual network identifier as part of an L2 header for the aggregated packet. The virtual network identifiers may include, for example, MPLS labels each associated with a different overlay network.

As a result of the above techniques, virtual router forwarding plane 128 may receive a single aggregated packet to be processed and forwarded by routing instances 122, rather than a series of multiple packets each having separate headers that must be individually processed and forwarded by routing instances 122. This may improve the overall bandwidth of computing device 100 by reducing cycles taken by cores 108 for destination lookup, the number of packets passed by the hypervisor (e.g., hypervisor 31 of FIG. 2) to the virtual router 120, and potentially other packet header processing tasks.

GRO is described in further detail in U.S. Pat. No. 9,571,394, issued Feb. 14, 2017, and entitled TUNNELED PACKET AGGREGATION FOR VIRTUAL NETWORKS, the description of which is incorporated herein by reference.

Figure 4A:
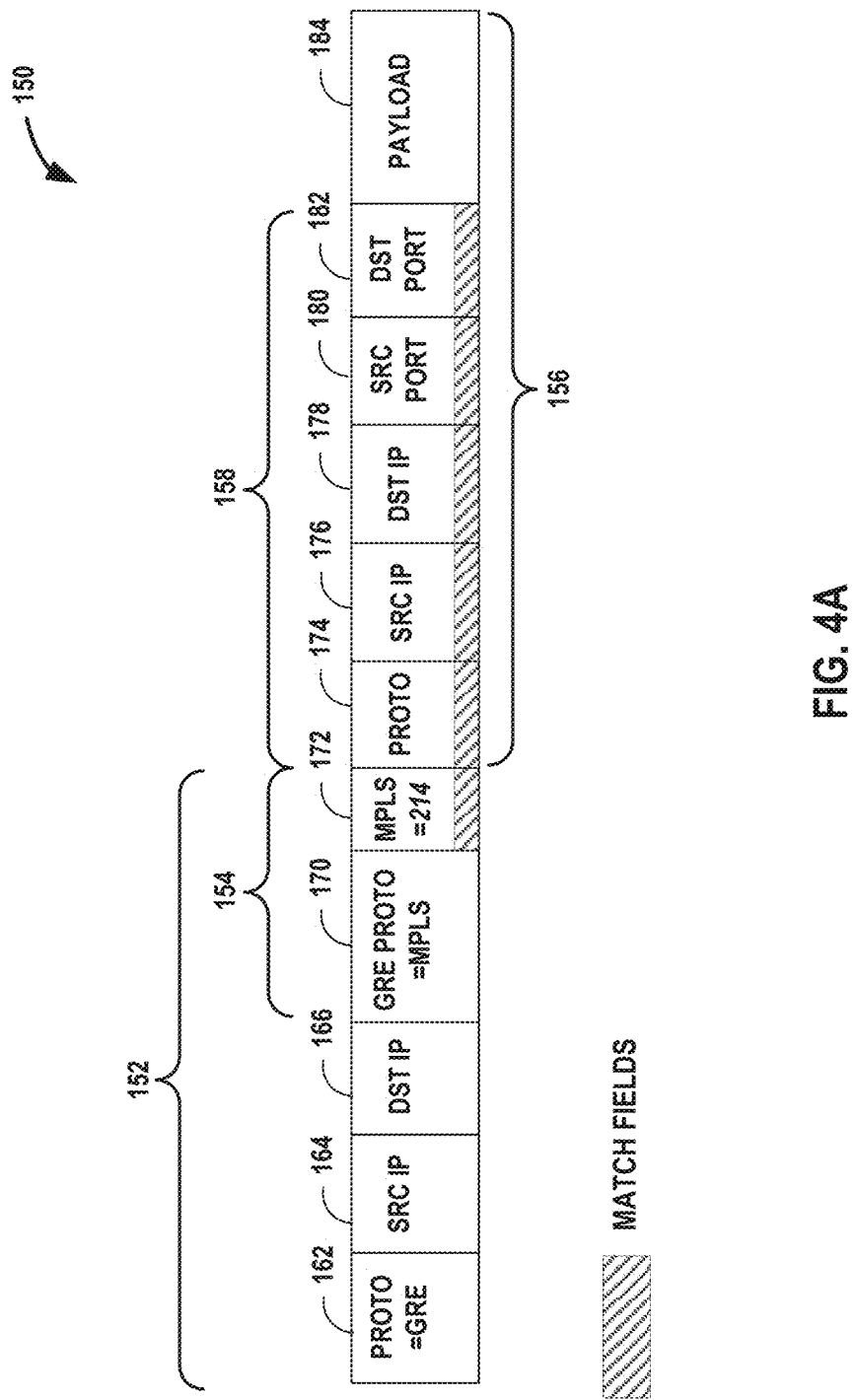
FIGS. 4A and 4B are block diagrams illustrating example tunnel packets that may be processed by a computing device according to techniques described in this disclosure.
Figure 4B:
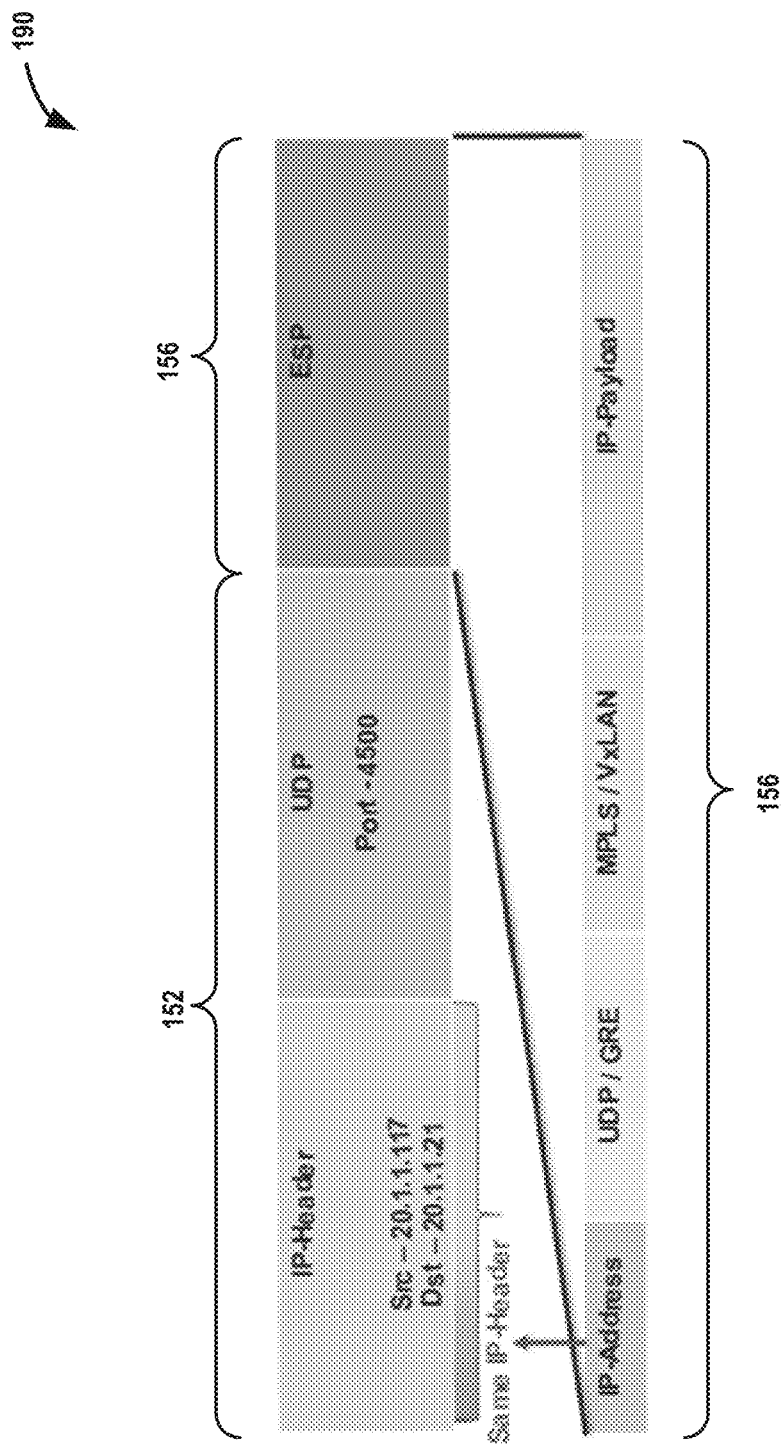

FIGS. 4A and 4B are block diagrams illustrating example tunnel packets that may be processed by a computing device according to techniques described in this disclosure. For simplicity and ease of illustration, tunnel packet 150 in FIG. 4A does not illustrate each and every field of a typical tunnel packet but is offered to highlight the techniques described herein. In addition, various implementations may include tunnel packet fields in various orderings. "Outer" or "tunnel" packet 150 includes outer header 152 and inner or "encapsulated" packet 156. Outer header 152 may include protocol or type-of-service (TOS) field 162 and public (i.e., switchable by the underling physical network for a virtual network associated with inner packet 156) IP address information in the form of source IP address field 164 and destination IP address field 166. Protocol field 162 in this example indicates tunnel packet 150 uses GRE tunnel encapsulation, but other forms of tunnel encapsulation may be used in other cases, including IPinIP, NVGRE, VxLAN, and MPLS over MPLS, for instance.

Outer header 152 also includes tunnel encapsulation 154, which in this example includes GRE protocol field 170 to specify the GRE protocol (here, MPLS) and MPLS label field 172 to specify the MPLS label value (here, 214). The MPLS label field is an example of a virtual network identifier and may be associated in a virtual router (e.g., virtual router 120 of computing device 100 of FIG. 3) with a routing instance for a virtual network.

Inner packet 156 includes inner header 158 and payload 184. Inner header 158 may include protocol or type-of-service (TOS) field 174 as well as private (i.e., for a particular virtual routing and forwarding instance) IP address information in the form of source IP address field 176 and destination IP address field 178, along with transport layer information in the form of source port field 180 and destination port field 182. Payload 184 may include application layer (layer 7 (L7)) and in some cases other L4-L7 information produced by or for consumption by a virtual machine for the virtual network. Payload 184 may include and thus alternatively be referred to as an "L4 packet," "UDP packet," or "TCP packet."

FIG. 4B illustrates an MPLS over UDP tunnel packet 190. Tunnel packet 190 includes an outer header 152 and an encrypted inner packet 156 encrypted as an ESP payload. As in the example in FIG. 4A, the packet structure supports address preservation, thus allowing routing of the encrypted packet in the IP fabric underlay network.

In accordance with techniques described in this disclosure, a computing device may perform GRO to aggregate multiple instances of tunnel packet 150 having multiple different payloads 184 to form an aggregate tunnel packet that includes all of the different payloads 184 from the various packets yet has a single instance of inner header 158. In some cases, the aggregate tunnel packet may also include at least the virtual network identifier (in this example, MPLS label field 172) of tunnel encapsulation 154. To identify packets to be aggregated to form an aggregate tunnel packet, the computing device may read certain match fields of the packets that define matching criteria. The match fields may include at least the virtual network identifier. In the illustrated example, the match fields include MPLS label field 172 (a virtual network identifier), protocol field 174, private source IP address field 176, private destination IP address field 178, source port 180, and destination port 182. In other words, the inner header 158 of inner packet 156 along with MPLS field 172. The computing device may aggregate instances of tunnel packet 150 that match on all of the match fields to generate an aggregate tunnel packet.

In some instances, the computing device may generate, or otherwise provide to the GRO routine, L2 headers for inner packet 156 using the virtual network identifier for tunnel packet 150 (e.g., MPLS label field 172). In this way, the GRO routine applied by the computing device may match virtual network identifiers re-characterized as, e.g., destination MAC addresses or other elements of an L2 header, and thus without requiring modification of the GRO routine and interface to separately match packets according to a specific virtual network identifier parameter.

Figure 5:
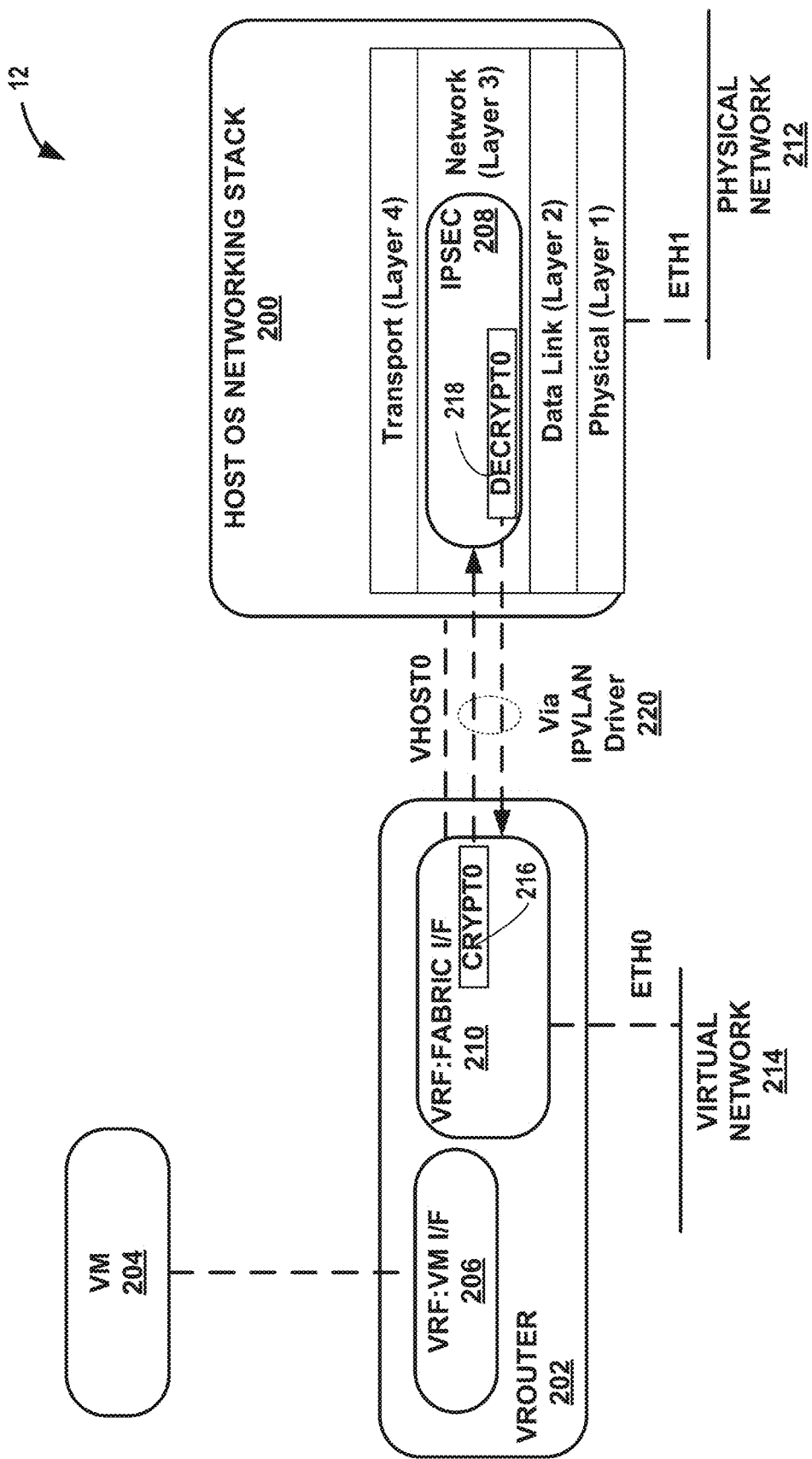
FIG. 5 is a block diagram illustrating a computing device that executes an example virtual router for virtual networks according to techniques described herein.

FIG. 5 is a block diagram illustrating a computing device that executes an example virtual router for virtual networks according to techniques described herein. In the example approach of FIG. 5, a server 12 (such as servers 12 of FIG. 1) includes a host operating system 200 and a vrouter 202 connected to a virtual machine 204 via a VRF:VM interface 206. Vrouter 202 is also connected through the VRF:Fabric interface 210 to virtual network 214 via eth0. Vrouter 202 of FIG. 5 may, as one example, represent any of virtual routers 30, 120 described herein.

In the example illustrated in FIG. 5, host operating system (OS) 200 includes a host OS networking stack 206 connected to a physical network 212. Host OS networking stack 206 includes at least layers 1-4, with layer 1 the physical link layer, layer 2 the data link layer, layer 3 the network layer and layer 4 the transport layer. Each of layers 1-4 run in kernel mode. Layer 3 includes an IPSec module 208 that also runs in kernel mode as described above. Host OS networking stack 206 is connected through layer 1 to physical network 212 via eth1.

In one example approach, vrouter 202 is modified to include a crypt0 interface 216. Packets to be encapsulated for tunnel communications are routed through crypt0 interface 216 to IPSec module 208. In one such example approach, IPSec module 208 includes code that monitors crypt0 interface 216 and acts on packets when detected in crypt0 interface 216. Once at IPSec module 208, the IPSec kernel performs the required encapsulation before returning the encapsulated packet to vrouter 202.

In one example approach, the IPSec kernel applies policies defined when provisioning the IPSec kernel when deciding whether or not to encapsulate a packet received for encapsulation. For instance, the IPSec kernel may have been configured to ignore requests for encapsulation when a destination address matches certain predefined IP addresses. In such example approaches, the IPSec kernel performs the encapsulation based on the policies defined when provisioning the IPSec kernel before returning the packet, encapsulated or not encapsulated, to vrouter 202. Vrouter 202 then transmits the packet received from IPSec module 208 across virtual network 214 via the physical network 212 underlay.

A similar approach is used to decrypt packets received by vrouter 202 from virtual network 214. In one example approach, vrouter 202 receives an encapsulated packet from virtual network 214. The encapsulated packet includes a source address and a destination address. The destination address is associated with a virtual machine 204 executing on server 12. Vrouter 202 inspects the packet, determines that the packet is an ESP packet and forwards the packet to IPSec module 208 of host OS networking stack 200. In one example approach, Vrouter 202 only forwards certain types of packets up the vrouter network stack. All others, including encapsulated packets, are transferred to the host OS networking stack 200 for processing. In one such example approach, IPSec module 208 is modified to include a decrypt0 interface 218. Traffic to be transferred back to vrouter 202 (such as decrypted tunnel packets) is routed to decrypt0 interface 218. In one such approach, vrouter 202 includes code that monitors decrypt interface 218. Vrouter 202 retrieves the decrypted packets when detected and forwards the decrypted packets to the virtual machines associated with the packet destination addresses.

In some example approaches, vrouter 202 applies policies (such as policies stored in policy table 138 of FIG. 3D) to determine the traffic that should be shifted to host OS networking stack 200. The policies may, for instance, detail the types of packets to transfer to host OS networking stack 200, or ranges of destination addresses not subject to tunnel communication. The policies may also define, for instance, whether a particular vrouter 202 is permitted to use IPSec module 208 for encapsulated. In one example approach, encryption with IPSec module 208 is enabled or disabled at the vrouter 202 level such that some vrouters may be enabled while others will not. In some such example approaches, an API executing in network controller 22 provides the mechanism for selecting the vrouters 202 that can access IPSec module 208. In some such example approaches, network control 22 includes a GUI used to select the vrouters 202 that can access IPSec module 208.

In one example approach, an IPVLAN driver 220 is used to transfer data between the vrouter 202 and host OS networking stack 200. The IPVLAN driver is a Linux driver used predominately to connect containers. Since the IPVLAN protocol exposes underlay or host interfaces directly to virtual machines or containers running in the host, however, IPVLAN driver 220 can be used to route packets between kernels sharing the same kernel space, such as kernel space 112 of FIG. 3D. IPVLAN supports L2 and L3 mode. In L2 mode, each endpoint gets the same MAC address but different IP addresses. In L3 mode, packets are routed between endpoints, providing full Layer 3 connectivity. IPVLAN driver 220 may, for example, represent driver 62 described above.

In one example approach, IPVLAN in L3 mode is used to connect an IPSec kernel in IPSec module 208 to the vrouter 202 kernel. In one such example approach, crypt0 interface 216 in vrouter 202 is defined for IPVLAN driver 220 as follows:

--- ip link add ipsec0 link vhost0 type ipvlan mode l3
ip link set dev ipsec0 up
vif -add ipsec0 -mac 52:54:00:bd:74:ac -vrf 0 -vhost-phys -type physical

---

Packets are sent through crypt0 interface 216 to the IPSec kernel for encrypting using IPVLAN driver 220. In one example approach, an agent 35 (such as shown in FIG. 2) programs vrouter 202 with a next hop to point to crypt0 interface 216. The encrypted packets are then returned via the IPVLAN driver 220 to vrouter 200 for transmission on virtual network 214. In one example approach, the IPSec kernel reads packets from crypt0 interface 216 and encrypts those packets that match the defined protocol and port (e.g., MPLS or UDP packets over port 6635, VxLAN packets over UDP Port 4789 and GRE packets are encrypted).

One example technical advantage of this approach is that, since in some example approaches both the IPSec kernel and vrouter 202 execute in kernel space of the same device, packets may be sent as a simple pointer to the shared address space used to store the packets being transferred.

In one example approach, packets received from physical network 212 first pass through the vrouter network stack. If certain header types (such as MPLS headers) are detected, the packets are routed up the virtual router network stack. Otherwise, the packets are sent up the host OS networking stack 200. Packets that are ESP packets are decrypted by IPSec module 208 and sent through the decrypt0 interface 218 via IPVLAN driver 220 to the vrouter kernel via the IPVLAN driver 220 for further processing.

If the packets are not ESP packets or are not intended for a device on the virtual network, the packet is routed via the host OS networking stack 200.

In another example approach, packets received from physical network 212 for virtual network 214 pass up through the vrouter network stack. If vrouter 202 determines the packets are ESP packets, the packets are routed through IPVLAN driver 220 to the IPSec kernel, decrypted by the IPSec kernel and routed back through IPVLAN driver 220 to vrouter 202 for further processing.

Figure 6:
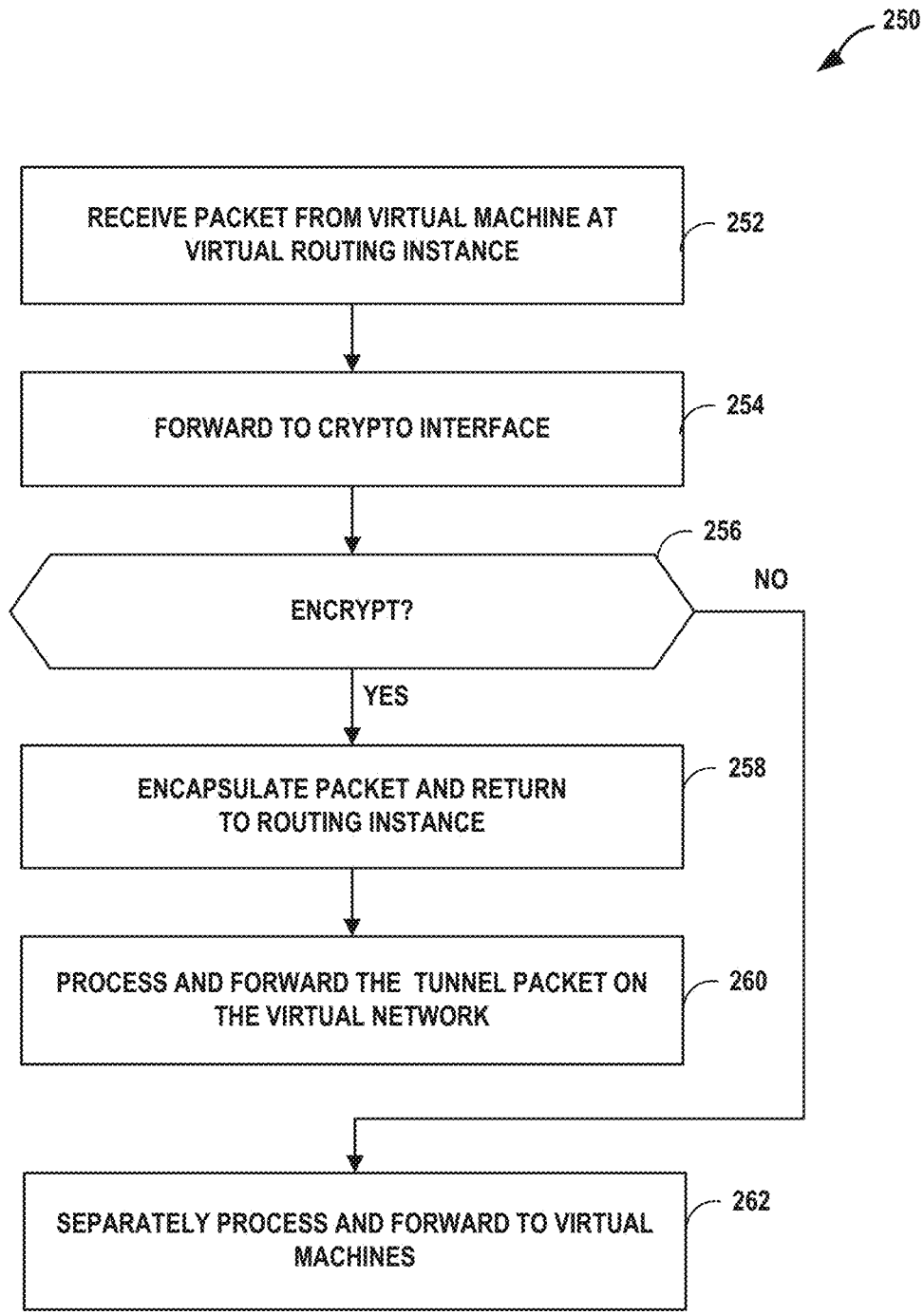
FIG. 6 is a flowchart illustrating an example mode of operation of a computing device for receiving and processing outbound packets, in accordance with techniques described herein.

FIG. 6 is a flowchart illustrating an example mode of operation 250 of a computing device for receiving and processing outbound packets, in accordance with techniques described herein. The example mode of operation may be described with respect to computing device 100 of FIG. 3D and tunnel packet 150 of FIGS. 4A and 4B. A routing instance 122 of vrouter 120 receives a packet from a local virtual machine 36 (252). Routing instance 122 forwards the packet via, for instance, the IPVLAN driver to IPSec module 125 (254). IPSec module 125 determines, based on policies, whether to encrypt the packet (256). In some examples, a policy applies encryption based on one or more of the IP addresses in the packet. If the decision is to encrypt, the packet is encrypted, encapsulated and sent back to routing instance 122 (258). Routing instance 122 then transmits the encapsulated packet to the destination (260).

If the decision is to not encrypt, the packet is sent back to routing instance 122, which then transmits the packet to the destination (262).

Figure 7:
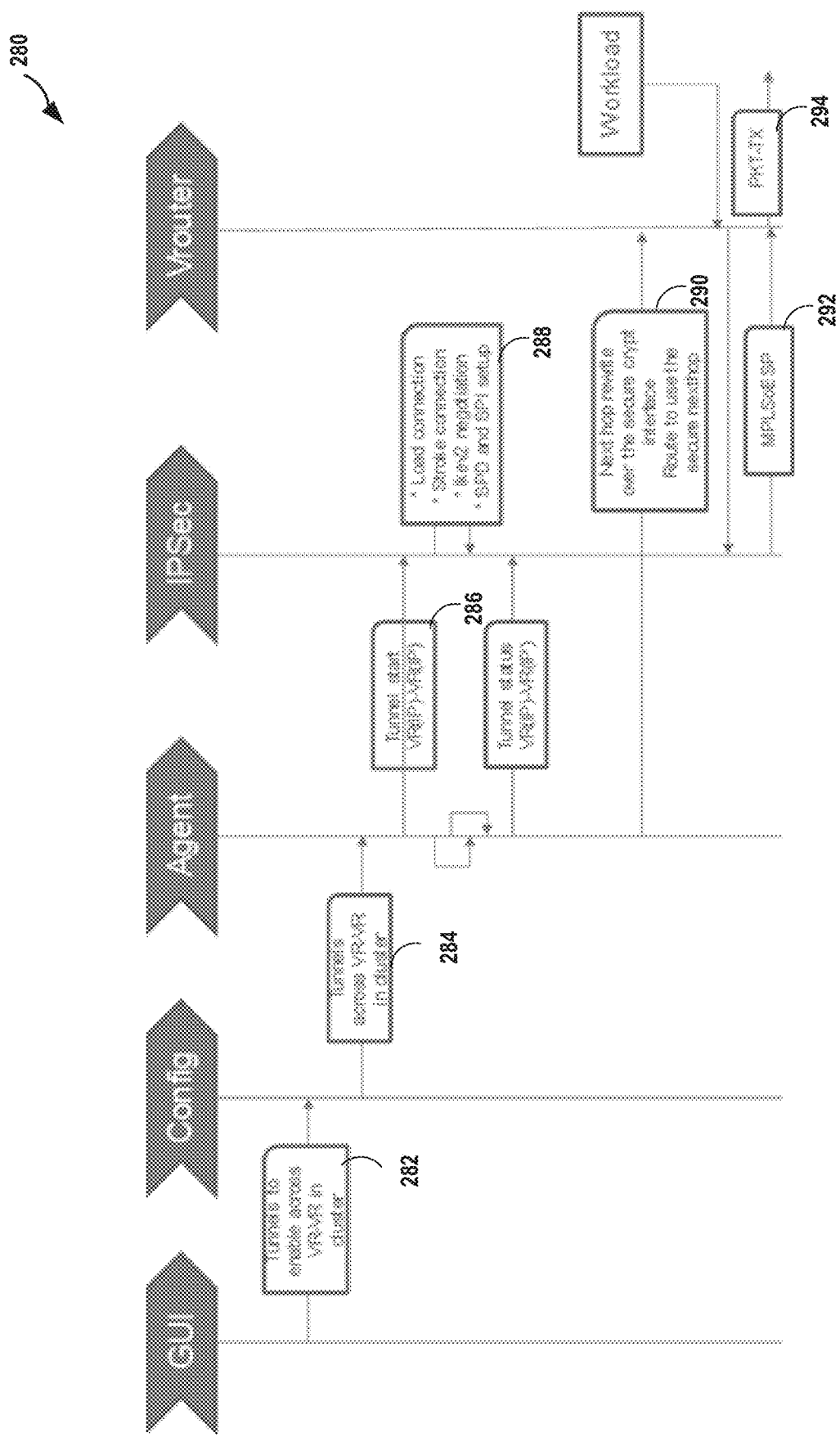
FIG. 7 is a process flow illustrating an example mode of operation of a computing device for configuring a vrouter to tunnel packets, in accordance with techniques described herein.

FIG. 7 is a process flow illustrating an example mode of operation 280 of a computing device for configuring a vrouter to tunnel packets, in accordance with techniques described herein. The example mode of operation may be described with respect to computing device 100 of FIG. 3D and tunnel packet 150 of FIGS. 4A and 4B. A GUI enables tunnels across VRs in a cluster (282). In response a config file is generated and sent to a virtual network agent (284). The agent configures the IPSec module to enable tunneling (286) and the IPSec module is setup as provisioned (288). The VN agent then configures next hop status to point to crypt0 (290). Subsequent packets are therefore sent to the IPSec module for encryption and/or encapsulation and then returned to the vrouter (292) for transfer on the network (294).

Figure 8:
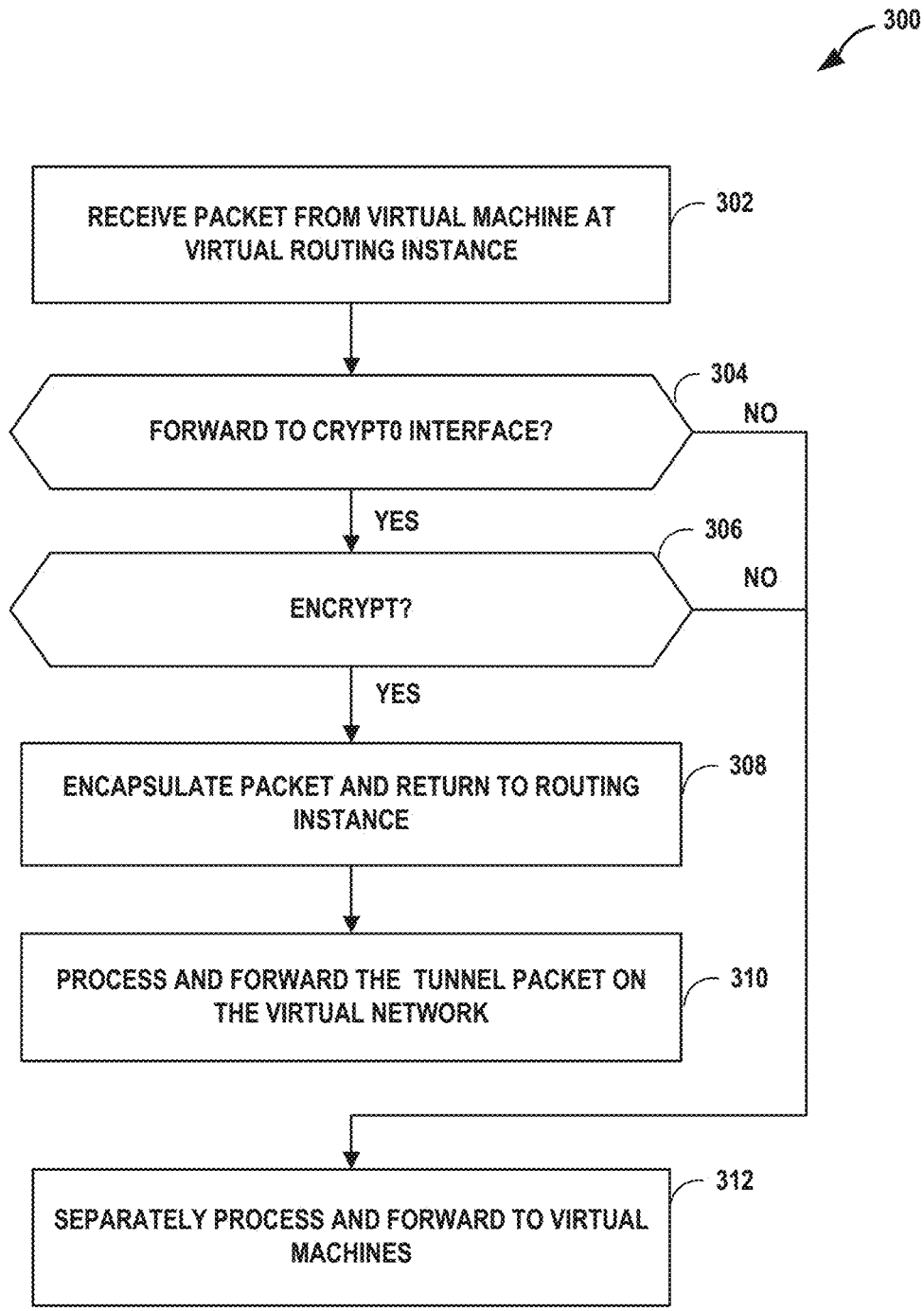
FIG. 8 is a flowchart illustrating an example mode of operation 300 of a computing device for receiving and processing outbound tunnel packets, in accordance with techniques described herein.

FIG. 8 is a flowchart illustrating an example mode of operation 300 of a computing device for receiving and processing outbound tunnel packets, in accordance with techniques described herein. The example mode of operation may be described with respect to computing device 100 of FIG. 3D and tunnel packet 150 of FIGS. 4A and 4B. A routing instance 122 of vrouter 120 receives a packet from a local virtual machine 36 (302). Routing instance 122 determines if the packet is to be encrypted or encapsulated (304). Vrouter 120 may encrypt, for instance, as a function of one or more addresses in the packet. If the packet is to be encrypted or encapsulated, routing instance 122 forwards the packet via, for instance, the IPVLAN driver to IPSec module 125 (304—Yes path). IPSec module 125 determines, based on policies, whether to encrypt the packet (306). In some example approaches, a security policy includes policies applied at vrouter 120 and at IPSec module 125. If the decision is to encrypt, the packet is encrypted and encapsulated by IPSec module 125 and returned to routing instance 122 (308). Routing instance 122 then transmits the encapsulated packet to the destination (310).

If routing instance 122 determines that the packet is not to be encrypted or encapsulated, routing instance 122 transmits the packet to the destination (304—No path).

If the decision at 306 is to not encrypt (306—No path), the packet is sent back to routing instance 122, which then transmits the packet to the destination (262).

Figure 9:
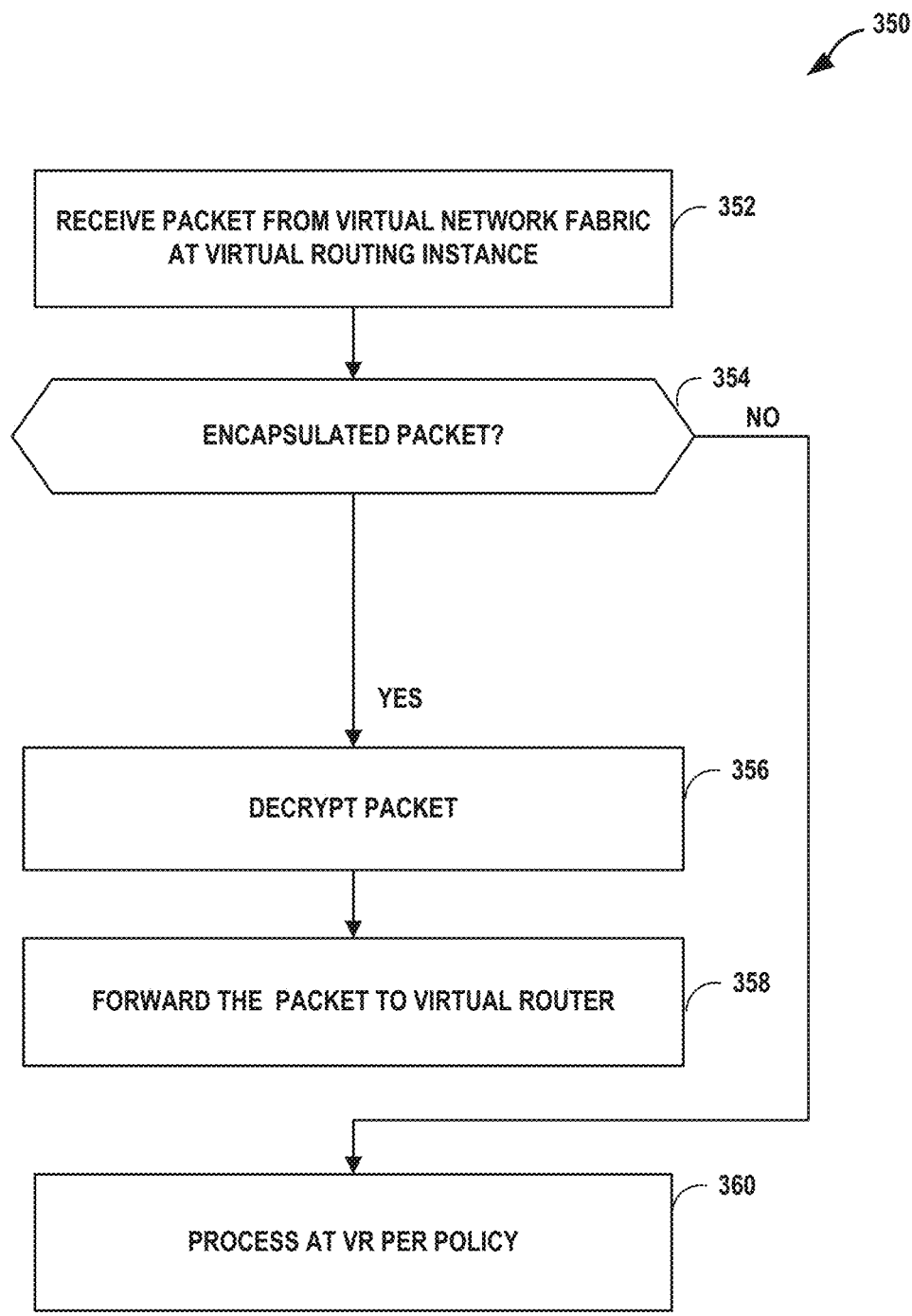
FIG. 9 is a flowchart illustrating an example mode of operation 350 of a computing device for receiving and processing inbound packets, in accordance with techniques described herein.

FIG. 9 is a flowchart illustrating an example mode of operation 350 of a computing device for receiving and processing inbound packets, in accordance with techniques described herein. The example mode of operation may be described with respect to computing device 100 of FIG. 3D and tunnel packet 150 of FIGS. 4A and 4B. A routing instance 122 of vrouter 120 receives a packet from a NIC 160 (352). Routing instance 122 determines if the packet is encapsulated (354). If the packet is encapsulated, routing instance 122 forwards the packet via, for instance, the IPVLAN driver to IPSec module 125 (354 —Yes path). IPSec module 125 decrypts the packet (356) and sends the decrypted packet back to routing instance 122 for further processing (358). Routing instance 122 then routes the decrypted packet to the destination (360).

If routing instance 122 determines that the packet is not encapsulated (354—No path), routing instance 122 transmits the packet to the destination (360).

Figure 10:
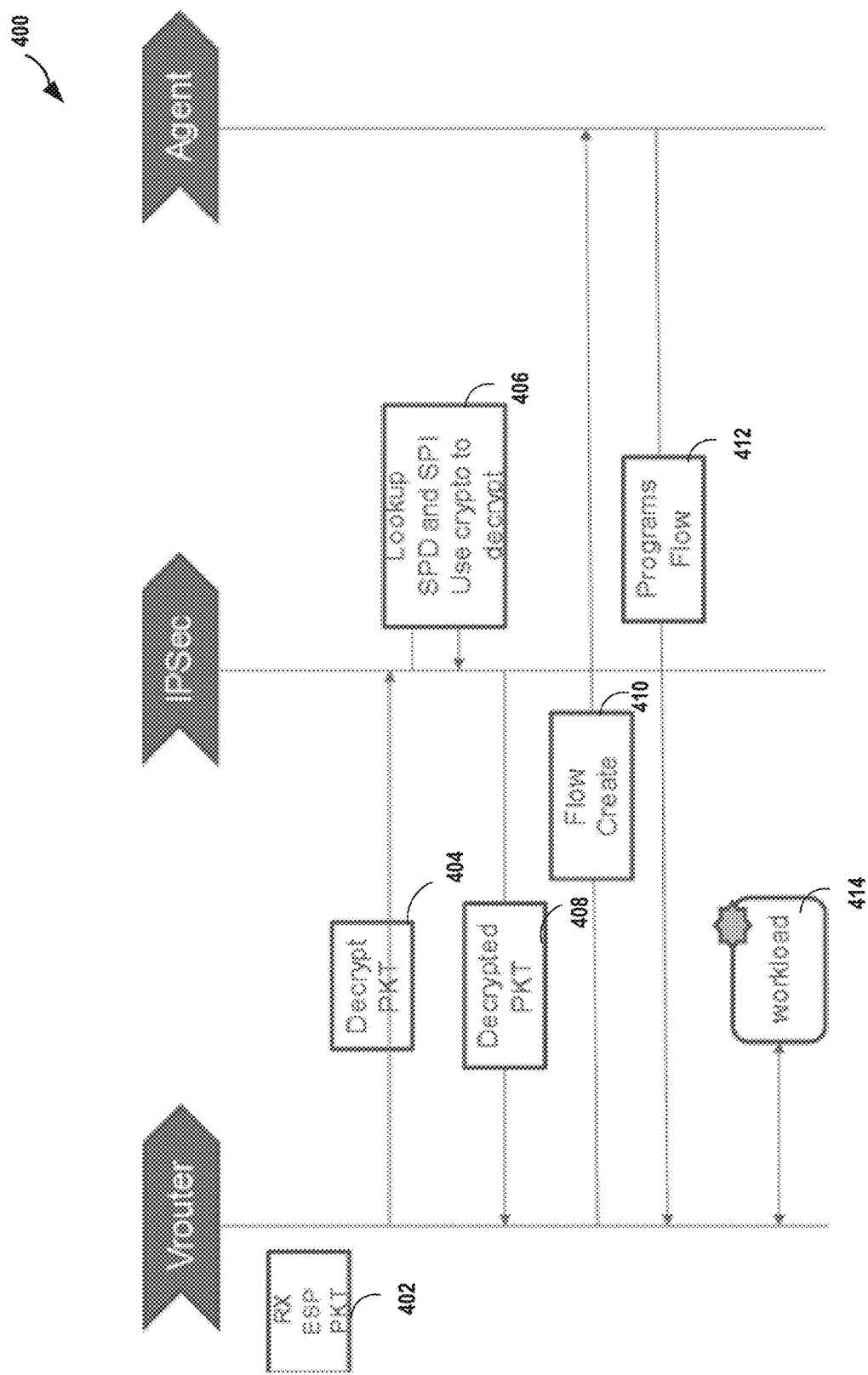
FIG. 10 is a process flow illustrating an example mode of operation 400 of a computing device for handling inbound encapsulated packets at a vrouter, in accordance with techniques described herein.

FIG. 10 is a process flow illustrating an example mode of operation 400 of a computing device for handling inbound encapsulated packets at a vrouter, in accordance with techniques described herein. The example mode of operation may be described with respect to computing device 100 of FIG. 3D and tunnel packet 150 of FIGS. 4A and 4B. An ESP packet arrives at a routing instance 122 of vrouter 120 (402) and is forwarded to IPSec kernel for decrypting (404, 406). The decrypted packet is returned to vrouter 120 (408) and used to generate a new flow (410, 412). The packet is then routed to the destination VM 36 (414).

The techniques described herein, including in the preceding any of sections, may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random-access memory (RAM), read-only memory (ROM), non-volatile random-access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
receiving a packet at a virtual router, the virtual router executing in kernel space of a first computing device in a virtual network stack connected to a virtual network fabric, the packet including a source address and a destination address, the destination address associated with a virtual machine executing on a second computing device, wherein receiving the packet includes trapping the packet;
establishing a first Internet Protocol (IP) endpoint at the Network layer of the virtual network stack;
establishing a second IP endpoint at the Network layer of a host operating system (OS) networking stack associated with a host OS operating on the first computing device;
forwarding the packet from the virtual router to the second IP endpoint of the host OS networking stack via the first IP endpoint, wherein the host OS networking stack includes an IPSec encryption module that executes at the Network layer of the host OS networking stack in kernel space on the first computing device, wherein the host OS networking stack is connected to a physical network fabric operating as an underlay fabric for the virtual network fabric;
receiving the forwarded packet at the IPSec encryption module, encrypting the forwarded packet and forming an encapsulated packet that preserves the source and destination addresses, wherein encrypting the forwarded packet includes encrypting the forwarded packet using the IPSec encryption module;
returning the encapsulated packet to the Network layer of the virtual network stack of the virtual router, wherein returning includes transferring the encapsulated packet via the second IP endpoint to the first IP endpoint; and
transmitting the encapsulated packet from the virtual router to the virtual machine associated with the destination address via the physical network fabric.

2. The method of claim 1, wherein the method further comprises:
establishing a first Internet Protocol (IP) endpoint at the Network layer of a virtual network stack of a virtual router of the second computing device, the virtual router executing in kernel space of the second computing device in the virtual network stack, the virtual network stack connected to the virtual network fabric;
establishing a second IP endpoint at the Network layer of a host operating system (OS) networking stack associated with a host OS operating on the second computing device;
receiving the encapsulated packet at the virtual router of the second computing device;
forwarding the encapsulated packet from the virtual router of the second computing device to the second IP endpoint of the host OS networking stack via the first IP endpoint, wherein the host OS networking stack includes an encryption module that executes at the Network layer of the host OS networking stack in kernel space on the second computing device, wherein the host OS networking stack is connected to the physical network fabric;
receiving the forwarded encapsulated packet at the encryption module and decrypting the forwarded encapsulated packet to form a decrypted packet that preserves the source and destination addresses;
returning the decrypted packet to the Network layer of the virtual network stack of the virtual router of the second computing device, wherein returning includes transferring the decrypted packet from the second IP endpoint on the second computing device to the first IP endpoint on the second computing device; and
transmitting the decrypted packet from the virtual router of the second computing device to the virtual machine of the second computing device associated with the destination address of the decrypted packet.

3. The method of claim 1, wherein encrypting the packet to form an encapsulated packet further includes transforming the encrypted packet using Encapsulated Security Payload (ESP).

4. The method of claim 1, wherein forwarding the packet includes:
creating an IP/MPLS packet; and
writing the IP/MPLS packet to the encryption module via an encryption module interface.

5. The method of claim 4, wherein encrypting the packet to form an encapsulated packet further includes transforming the encrypted packet using Encapsulated Security Payload (ESP).

6. The method of claim 5, wherein the method further comprises:
establishing a first Internet Protocol (IP) endpoint at the Network layer of a virtual network stack of a virtual router of the second computing device, the virtual router executing in kernel space of the second computing device in the virtual network stack, the virtual network stack connected to the virtual network fabric;
establishing a second IP endpoint at the Network layer of a host operating system (OS) networking stack associated with a host OS operating on the second computing device;
receiving the encapsulated packet at the virtual router of the second computing device;
forwarding the encapsulated packet from the virtual router of the second computing device to the second IP endpoint of the host OS networking stack via the first IP endpoint, wherein the host OS networking stack includes an encryption module that executes at the Network layer of the host OS networking stack in kernel space on the second computing device, wherein the host OS networking stack is connected to the physical network fabric;
receiving the forwarded encapsulated packet at the encryption module and decrypting the forwarded encapsulated packet to form a decrypted packet that preserves the source and destination addresses;
returning the decrypted packet to the Network layer of the virtual network stack of the virtual router of the second computing device, wherein returning includes transferring the decrypted packet from the second IP endpoint on the second computing device to the first IP endpoint on the second computing device; and
transmitting the decrypted packet from the virtual router of the second computing device to the virtual machine of the second computing device associated with the destination address of the decrypted packet.

7. The method of claim 1, wherein forwarding the packet includes:
creating a VXLAN packet; and
writing the VXLAN packet to the encryption module via an encryption module interface.

8. The method of claim 7,
wherein encrypting the packet to form an encapsulated packet further includes transforming the encrypted packet using Encapsulated Security Payload (ESP).

9. The method of claim 8, wherein the method further comprises:
establishing a first Internet Protocol (IP) endpoint at the Network layer of a virtual network stack of a virtual router of the second computing device, the virtual router executing in kernel space of the second computing device in the virtual network stack, the virtual network stack connected to the virtual network fabric;
establishing a second IP endpoint at the Network layer of a host operating system (OS) networking stack associated with a host OS operating on the second computing device;
receiving the encapsulated packet at the virtual router of the second computing device, the virtual router executing in kernel space of the second computing device in a virtual network stack connected to the virtual network fabric;
forwarding the encapsulated packet from the virtual router of the second computing device to the second IP endpoint of the host operating system (OS) OS networking stack via the first IP endpoint, wherein the host OS networking stack includes an encryption module that executes at the Network layer of the host OS networking stack in kernel space on the second computing device, wherein the host OS networking stack is connected to the physical network fabric;
receiving the forwarded encapsulated packet at the encryption module and decrypting the forwarded encapsulated packet to form a decrypted packet that preserves the source and destination addresses;
returning the decrypted packet to the Network layer of the virtual network stack of the virtual router of the second computing device, wherein returning includes transferring the decrypted packet from the second IP endpoint on the second computing device to the first IP endpoint on the second computing device; and
transmitting the decrypted packet from the virtual router of the second computing device to the virtual machine of the second computing device associated with the destination address of the decrypted packet.

10. The method of claim 1, wherein
trapping the forwarded packet to the encryption module includes trapping the forwarded packet based on states and policies.

11. A network system comprising:
a switch fabric comprising a plurality of switches interconnected to form a physical network;
a virtual network controller configured to configure and manage one or more virtual networks within the physical network; and
a plurality of servers interconnected by the switch fabric, wherein each of the servers comprises an operating environment executing one or more virtual machines in communication via the one or more virtual networks, wherein the servers include a first server and a second server, wherein each server includes a host operating system (OS) executing in kernel space on the server, wherein a virtual router executes in kernel space on each server in a virtual network stack connected to one or more of the virtual networks, wherein each virtual router is configured to extend the one or more virtual networks to the operating environments of the virtual machines,
wherein the first server is configured to:
establish a first Internet Protocol (IP) endpoint at the Network layer of the virtual network stack of each server;
establish a second IP endpoint at the Network layer of a host OS networking stack associated with the host OS operating on each server, the first and second IP endpoints providing a mechanism for transferring data between the Network layer of the virtual network stack of one server to the Network layer of the host OS networking stack of the same server;
receive, at the virtual router of the first server, a packet sent from one of the one or more virtual machines executing on the first server, the packet including a source address and a destination address, wherein receiving the packet includes trapping the packet;
forward the packet from the virtual router of the first server to the second IP endpoint of the host OS networking stack of the first server via the first IP endpoint, wherein the host OS networking stack includes an IPSec encryption module that executes at the Network layer of the host OS networking stack in kernel space on the first server and wherein the host OS networking stack is connected to the switch fabric operating as an underlay fabric for one or more of the virtual networks;
receive the forwarded packet at the IPSec encryption module, encrypt the forwarded packet and form an encapsulated packet that preserves the source and destination addresses, wherein encrypting the forwarded packet includes encrypting the forwarded packet using the IPSec encryption module;
return the encapsulated packet to the Network layer of the virtual network stack of the virtual router, wherein returning includes transferring the encapsulated packet from the second IP endpoint of the first server to the first IP endpoint of the first server; and
transmit the encapsulated packet from the virtual router to the destination address via the switch fabric.

12. The network system of claim 11, wherein the first server is further configured to create an IP/MPLS or VXLAN packet and to write the IP/MPLS or VXLAN packet to an interface of the IPSec encryption module while forwarding the packet from the virtual router of the first server to a host OS networking stack associated with the host OS executing in kernel space of the first server.

13. The network system of claim 12,
wherein encrypting the packet to form an encapsulated packet further includes transforming the encrypted packet using Encapsulated Security Payload (ESP).

14. The network system of claim 13, wherein the second server is configured to:
receive the encapsulated packet at the virtual router of the second server;
forward the packet from the virtual router of the second server to the second IP endpoint of the host OS networking stack via the first IP endpoint the second server, wherein the host OS networking stack includes an encryption module that executes at the Network layer of the host OS networking stack in kernel space on the second server and wherein the host OS networking stack is connected to the switch fabric operating as an underlay fabric for one or more of the virtual networks;
receive the forwarded encapsulated packet at the encryption module and decrypt the forwarded encapsulated packet to form a decrypted packet that preserves the source and destination addresses;

return the decrypted packet to the Network layer of the virtual network stack of the virtual router of the second server, wherein returning includes transferring the decrypted packet from the second IP endpoint on the second server to the first IP endpoint on the second server; and transmit the decrypted packet from the virtual router of the second server to the virtual machine of the second server device associated with the destination address of the decrypted packet.

15. The network system of claim 11, wherein the second server is configured to:

receive the encapsulated packet at the virtual router of the second server;

forward the packet from the virtual router of the second server to the second IP endpoint of the host OS networking stack via the first IP endpoint of the second server, wherein the host OS networking stack includes an encryption module that executes at the Network layer of the host OS networking stack in kernel space on the second server and wherein the host OS networking stack is connected to the switch fabric operating as an underlay fabric for one or more of the virtual networks;

receive the forwarded encapsulated packet at the encryption module and decrypt the forwarded encapsulated packet to form a decrypted packet that preserves the source and destination addresses;

return the decrypted packet to the Network layer of the virtual network stack of the virtual router of the second server, wherein returning includes transferring the decrypted packet from the second IP endpoint on the second server to the first IP endpoint on the second server; and transmit the decrypted packet from the virtual router of the second server to the virtual machine of the second server device associated with the destination address of the decrypted packet.

16. A non-transitory computer-readable medium comprising instructions for causing one or more programmable processors of a computing device to:

receive, at a virtual router executing within a virtual network stack in kernel space of the computing device, a packet from a virtual machine executing on the computing device, the packet including a source address and a destination address, wherein the virtual network stack includes an interface to a virtual network fabric, wherein receiving the packet includes trapping the packet;

establish a first Internet Protocol (IP) endpoint at the Network layer of the virtual network stack;

establish a second IP endpoint at the Network layer of a host operating system (OS) networking stack associated with a host OS operating on the computing device;

forward the packet from the virtual router executing within the virtual network stack to the second IP endpoint of the host OS networking stack via the first IP endpoint, wherein the host OS networking stack includes an IPSec encryption module that executes at the Network layer of the host OS networking stack in kernel space on the computing device, wherein the host OS networking stack includes an interface to a physical network fabric operating as an underlay fabric for the virtual network fabric;

receive the forwarded packet at the encryption module, encrypt the forwarded packet and form an encapsulated packet that preserves the source and destination addresses, wherein encrypting the forwarded packet includes encrypting the forwarded packet using the IPSec encryption module;

return the encapsulated packet to the Network layer of the virtual network stack of the virtual router, wherein returning includes transferring the encapsulated packet via the second IP endpoint to the first IP endpoint; and transmit the encapsulated packet from the virtual router to the virtual machine associated with the destination address via the physical network fabric.

* * * * *

UNITED STATES PATENT AND TRADEMARK OFFICE
CERTIFICATE OF CORRECTION

PATENT NO. : 11,233,778 B2
APPLICATION NO. : 16/146713
DATED : January 25, 2022
INVENTOR(S) : Sanju C. Abraham, Kiran N. Kasim and Prasad Miriyala It is certified that error appears in the above-identified patent and that said Letters Patent is hereby corrected as shown below:

In the Claims

Column 27, Lines 18-25 (Claim 9): replace "receiving the encapsulated packet at the virtual router of the second computing device, the virtual router executing in kernel space of the second computing device in a virtual network stack connected to the virtual network fabric; forwarding the encapsulated packet from the virtual router of the second computing device to the second IP endpoint of the host operating system (OS) OS networking stack" with --receiving the encapsulated packet at the virtual router of the second computing device; forwarding the encapsulated packet from the virtual router of the second computing device to the second IP endpoint of the host OS networking stack--

Column 27, Lines 46-47 (Claim 10): replace "packet to the encryption module includes trapping" with --packet includes trapping--

Signed and Sealed this
Twenty-third Day of May, 2023

Katherine Kelly Vidal
Director of the United States Patent and Trademark Office